United States Patent
Oz et al.

(10) Patent No.: US 6,999,477 B1
(45) Date of Patent: Feb. 14, 2006

(54) METHOD AND SYSTEM FOR PROVIDING MULTIPLE SERVICES TO END-USERS

(75) Inventors: Ran Oz, Modiin (IL); Michael Field, San Diego, CA (US)

(73) Assignee: BigBand Networks, Inc., Redwood City, CA (US)

( * ) Notice: Subject to any disclaimer, the term of this patent is extended or adjusted under 35 U.S.C. 154(b) by 916 days.

(21) Appl. No.: 09/841,579

(22) Filed: Apr. 23, 2001

Related U.S. Application Data

(63) Continuation-in-part of application No. 09/579,551, filed on May 26, 2000, now Pat. No. 6,434,141.

(51) Int. Cl.
H04H 1/04 (2006.01)

(52) U.S. Cl. .................................................. 370/486

(58) Field of Classification Search ............... 370/352, 370/422, 426, 419, 420, 535, 486, 468, 538, 370/539, 540, 356; 709/227, 228
See application file for complete search history.

(56) References Cited

U.S. PATENT DOCUMENTS 6,128,649 A * 10/2000 Smith et al. ................ 709/217
6,141,339 A * 10/2000 Kaplan et al. .............. 370/352

* cited by examiner

Primary Examiner—Chi Pham
Assistant Examiner—Alexander O. Boakye
(74) Attorney, Agent, or Firm—Blakely, Sokoloff, Taylor & Zafman LLP

(57) ABSTRACT

Method and system for dynamic provision of service conveying packets to groups of end-users, each group of end-users is coupled to the system via a bandwidth limited media, the system including: a router, operative to receive service conveying packets and to provide to each group of end-users group associated service conveying packets; a session manager, coupled to the router, said session manager providing routing instructions to said router, for dynamically selecting group associated service conveying packets out of the received service conveying packets. At least some of the service conveying packets comprise media signals.

44 Claims, 24 Drawing Sheets

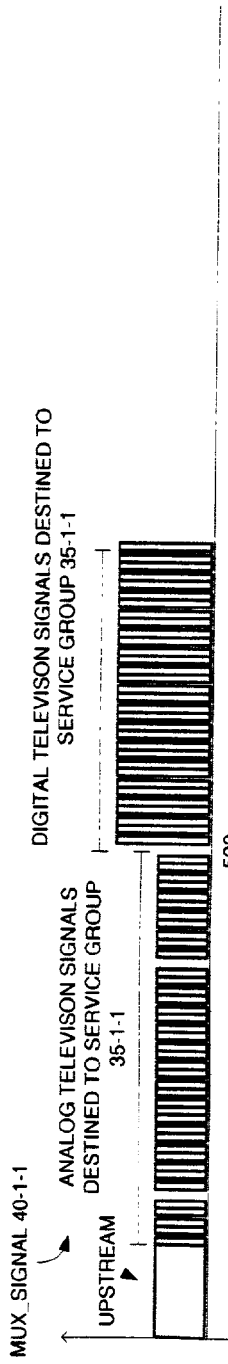
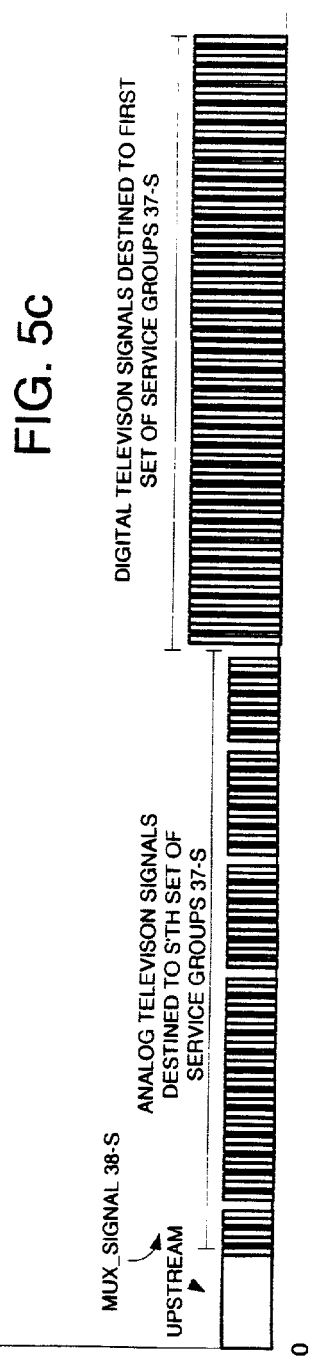
FIG. 5a
FIG. 5b
FIG. 5c
FIG. 5d

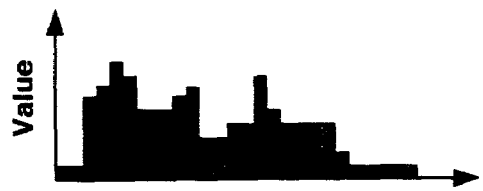
FIG. 16A DCT Coefficients
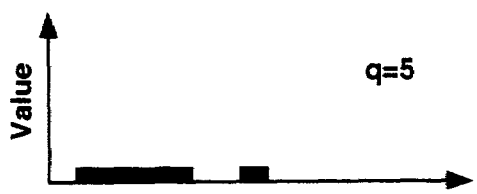
FIG. 16B
FIG. 16G
FIG. 16C
FIG. 16H
FIG. 16D
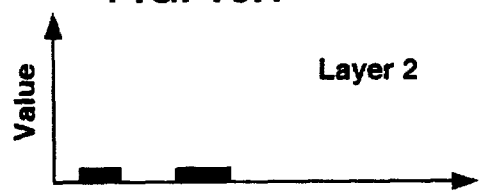
FIG. 16I
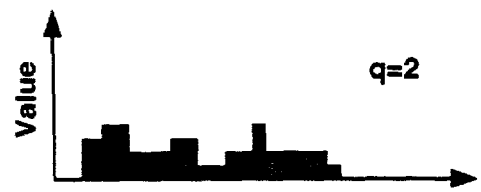
FIG. 16E
FIG. 16J
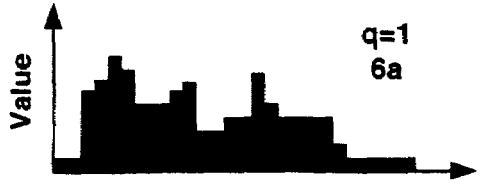
FIG. 16F
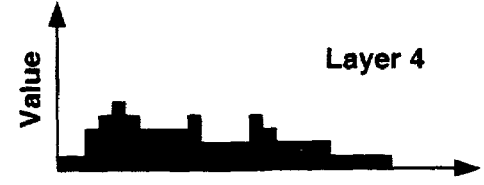
FIG. 16K

METHOD AND SYSTEM FOR PROVIDING MULTIPLE SERVICES TO END-USERS

RELATED CASES

This patent application is a Continuation-In-part of U.S. patent application Ser. No. 09/579,551 Filed May 26, 2000 now U.S. Pat. No. 6,434,141.

This patent application incorporates by reference U.S. patent application Ser. No. 09/595,624 Filed Jun. 16, 2000.

FIELD OF THE INVENTION

The present invention relates to communication systems and especially to methods and systems for providing multiple services to end-users.

BACKGROUND OF THE INVENTION

Information signals, such as data signals, media signals and especially compressed video and audio streams and packetized audio and video streams propagate over various communication channels, such as terrestrial, wireless, satellite and cable communication channels and the like. Video streams usually include a relatively large amount of information. Digital transmission and compression techniques allow for transmitting media signals over communication channels in a compressed form. The bandwidth of a digital television channel is usually less than the bandwidth of an analog television channel. The Moving Pictures Experts Group (MPEG) specifications are standardized methods for compressing and transmitting media signals such as video and audio.

Communication channels, such as cables, that interconnect end-users to a network have a very limited bandwidth. The limited bandwidth of these communication channels is also known as the last mile problem. This limited bandwidth limits the variety and amount of services that can be offered to an end-user. The problem is even more acute when the communication channels are used to transfer bandwidth-consuming services such as analog television channels.

FIG. 1 illustrates a prior art local distribution center 20 coupled to a plurality of sets of service groups 37-*s* via a plurality of prior art hubs 32-*s*. A set of service groups includes a plurality of service groups that are coupled to a single hub. Each service group includes a plurality of end-users, such as set top boxes and the like, that share the same communication link/output port of the hub. A service group is also known in the art as a "forward carrier path".

Local distribution center 20, also referred to as headend 20, is configured to receive information signals from distribution satellites 14 and 15, via satellite dishes 24, 22 and to receive signals from headend content provider 28. These information signals include a plurality of television programs, at least some being analog television signals. Local distribution center 20 selects some of the received signals and combines the selected signals to form a multiplexed signal MUX_SIGNAL 23. The content of a typical MUX_SIGNAL 23 is illustrated in FIG. 2. Upstream signals (signals transmitted from end-users to the headend) are received within 0–50 Mhz. A plurality of analog television signals in 6 or 8 Mhz channels are present at 50–500 Mhz. A plurality of digital television signals are present at 500–750 Mhz.

MUX_SIGNAL 23 is outputted from combiner 26, via network 30 to S splitters 32-*s*, s ranges between 1 to S. The splitters are usually located within hubs. Each splitter 32-*s* provides MUX_SIGNAL 23 to the end-users/members 34-*s*-*r*-*q* of the s'th set of service groups 37-*s*, r ranges between 1 and R, q ranges between 1 and Q.

A disadvantage of the prior art system is that the bandwidth of MUX_SIGNAL is limited by the bandwidth of the communication channels/links that interconnect end-users 34-*s*-*r*-*q* to splitters 32-*s*. As MUX-SIGNAL includes a plurality of analog television channels, the amount of services that can be provided to each end-user is very limited.

A further disadvantage of the prior art system is that the splitters and combiners cannot select the signals to be provided to a certain service group or a set of service group, so that all the end-users have to receive the same content.

Prior art grooming systems allow for selecting a limited number of channels to provide a single multiplexed signal to a service group. The prior art grooming systems are not configured to dynamically provide multiple multiplexed signals to a plurality of service groups and are not configured to receive and manage a large amount of received services.

There is a need to provide systems and methods for providing user specific content and/or services to end-users. There is a further need to exploit the limited bandwidth of a bandwidth communication link in an efficient manner. There is yet a further need to match the set of services provided to a group of end-users to the requirements, profiles and priorities associated with the group of end-users.

SUMMARY OF THE PRESENT INVENTION

It is an object of the present invention to provide systems and methods for efficiently utilizing bandwidth limited media for transmitting service group tailored services. The limited bandwidth is used to convey group of end-users specific content. Services for the end-users of a group of end-users are provided to the members of the group over service conveying packets.

The invention provides a system for dynamic provision of service conveying packets to groups of end-users, each group of end-users is coupled to the system via a bandwidth limited media, the system including: a router, operative to receive service conveying packets and to provide to each group of end-users group associated service conveying packets; a session manager, coupled to the router, said session manager providing routing instructions to said router, for dynamically selecting group associated service conveying packets out of the received service conveying packets. At least some of the service conveying packets include media signals.

BRIEF DESCRIPTION OF THE DRAWINGS

The present invention will be understood and appreciated more fully from the following detailed description taken in conjunction with the drawings in which:

FIG. 2 is a schematic illustration of a multiplexed signal MUX_SIGNAL provided from the prior art local distribution center to each of the end-users of the service groups;

FIGS. 5a–5d are schematic illustrations of multiplexed signals provided from and to the Broadband Multimedia Systems of FIGS. 4a–4b, in accordance with preferred embodiments of the present invention;

FIG. 16A, which is a visual representation of block DCT values, at a predetermined quantizing value, after basic quantizing;

FIGS. 16B, 16C, 16D, 16E and 16F are visual representations of the block of FIG. 16A, at different quantizing values, in accordance with a preferred embodiment of the present invention; and FIGS. 16G, 16H, 16I, 16J and 16K are representation of a layer structure, in accordance with another preferred embodiment of the present invention.

DETAILED DESCRIPTION OF PREFERRED EMBODIMENTS

Figure 1:
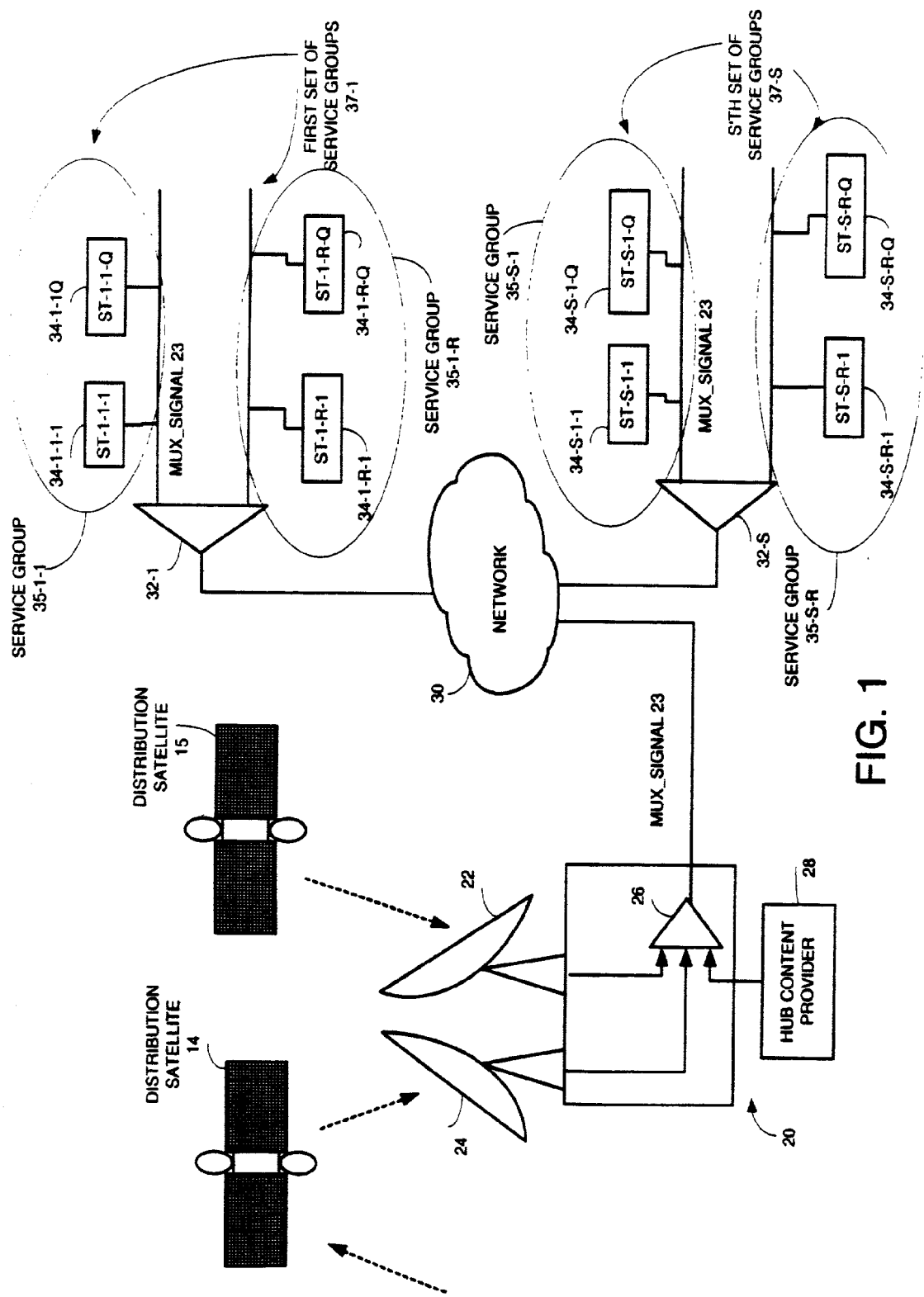
FIG. 1 is a schematic illustration of a prior art local distribution center coupled to a plurality of sets of service groups via a plurality of prior art hubs.

The present invention overcomes the disadvantages of the prior art by an efficient utilization of the limited bandwidth of a bandwidth limited media coupled to a group of end-users. The limited bandwidth is used to convey group of end-users specific content. Services for the end-users of a group of end-users are provided to the members of the group over service conveying packets.

The invention provides a system for dynamic provision of service conveying packets to groups of end-users, each group of end-users is coupled to the system via a bandwidth limited media, the system including: a router, operative to receive service conveying packets and to provide to each group of end-users group associated service conveying packets; a session manager, coupled to the router, said session manager providing routing instructions to said router, for dynamically selecting group associated service conveying packets out of the received service conveying packets. At least some of the service conveying packets include media signals.

Conveniently, a service conveying packet includes a plurality of information signals, such as a sequence of information signals and the like, that are either (a) associated with a service, (b) can be processed, either alone by themselves or in association with other service conveying packets; to provide at least a portion of a service to an end user, (c) media signals, (d) status signals, (e) control signals, (f) any combination of the mentioned above options, and the like.

Conveniently, the aggregate bandwidth of the received service conveying packets exceeds the bandwidth of the bandwidth limited media. The bandwidth limited media being a network, such as a HFC network, DSL network, wireless network and the like, a portion of the network, at least one communication line, and the like.

The invention provides a system for dynamic provision of service conveying packets to groups of end-users, whereas the service conveying packets convey a plurality of services such as digital television channels, analog television channel, video on demand, internet television, audio on demand, radio channel, telephony, data, internet and the like. The service can require downstream transmission of service conveying packets but can also include upstream transmission of service conveying packets.

The invention provides a method for dynamic provision of service conveying packets to group of end-users, each group of end-users is coupled to the system via a bandwidth limited media, at least some of the service conveying packets being media service conveying packets; the method including the steps of: receiving service conveying packets; whereas the aggregate bandwidth of the received service conveying packets exceeds the bandwidth of the limited bandwidth media; and dynamically selecting group associated service conveying packets out of the received service conveying packets to be provided to the associated group of end-users.

The selection of services to be provided to a group of end-users is responsive to various parameters, such as predefined selection parameter, selection parameter reflecting the type of a service, selection parameter reflecting a status of at least one end-user, selection parameter reflecting a previous status of at least one end-user, predefined priority parameter, selection parameter reflecting requests to receive a service, selection parameters reflecting a current provision of a service to end-users, selection parameters reflecting previous provisions of a requested service, selection parameters reflecting a relationship between at least two services, selection parameters reflecting at least one end-user behavior pattern, bandwidth utilization information, bandwidth network management information, policy information, general policy rules, network policy rules, shared area session policy rules, network reconstruction information and the like. Some of these parameters can be provided to the system in real time while other may be provided prior to the provision of the service. According to an aspect of the invention the end-users of a service group or a set of service groups are required to select service group associated services and set of service group associated services to be provided to their service group or set of service group respectively. For example, the end-users of a service group may select to receive a subset of G1 digital television channels out of the G2 digital television cannels received at a headend or a hub, and accordingly these G2 digital television channels will be provided to said service group members. G1<G2. According to another aspect of the invention the system monitors the viewing patterns of the users of the service group and accordingly can provide selected services to the viewers of a service group.

According to yet a further aspect of the invention when the provision of a service ends, when user constantly receives a service for a predefined time period a session that was initiated for conveying associated service conveying packets ends.

The invention provides a system for dynamic provision of services conveying packets to groups of end-users wherein the provision is responsive to service requests generated by end-users. Conveniently, the service request is generated in response to a display of a service request interface selected from the group consisting of: an electronic service guide, a surfing channel that cycles through available services, a surfing mosaic displaying accessible services; and a menu of accessible services.

The invention provides a system for dynamic provision of service to groups of end-users whereas the services are conveyed by service conveying packets. A service is provided to end-users when a session request for executing a session through the system, is accepted. Accordingly, the session manager either allows or denies each said session requests, said session manager provides resource allocation parameters for each said allowed sessions.

Conveniently, each service group out of a set of service groups coupled to the system is managed by a shared area manager. Each shared area manager is operative to select group associated service conveying packet to be provided to the associated group of end-users.

According to an aspect of the invention, some of the service conveying packets are non-addressable packets; while some service conveying packets are addressable packets; and the router includes: a plurality of input ports, including at least one non-addressable stream input port; a plurality of non-addressable stream output ports; a multiple port switch, connected between said non-addressable stream input ports and said non-addressable stream output ports; said multiple port switch directing a non-addressable service conveying packet, received from a selected one of said at least one non-addressable stream input ports, to at least a selected one of said at least one non-addressable stream output ports, said multiple port switch selecting said selected non-addressable stream output port according to the type and identity of said selected non-addressable stream input port and the identity information embedded in said non-addressable service conveying packet.

Conveniently, the system further includes at least one addressable stream communication port, connected to said multiple port switch, said multiple port switch directing an addressable service conveying packet, received from a selected one of said at least one addressable stream communication ports, to at least a selected one of said at least one non-addressable stream output ports. The selected non-addressable stream output port encapsulating a addressable service conveying packet in a non-addressable stream packet, when the addressable packet is received from one of said at least one addressable stream input ports.

Usually, at least one non-addressable stream input port includes a multiple program transport interface and wherein said at least one non-addressable stream output port includes a multiple program transport interface.

Preferably, MPEG transport packets are encapsulated into communication packets respective of the communication protocol of said multiple port switch.

Conveniently, the system further includes a plurality of stream processors, each said stream processor being connected between said multiple port switch and a respective one of said non-addressable stream output ports. Each said stream processors is operative to at least perform a procedure selected from the list consisting of: multiplexing; re-multiplexing; rate adaptation; PID re-mapping; PCR re-stamping; and updating system information embedded in transport streams.

According to a further aspect of the invention the system is operative to receive set of group associated service conveying packets from a high-tier system, the high-tier system including: a router, operative to receive service conveying packets and to provide the set of group associated service conveying packets to the system for dynamic provision of service conveying packets; a session manager, coupled to the router, said session manager providing routing instructions to said router, for dynamically selecting set of group associated service conveying packets out of the received service conveying packets; wherein at least some of the service conveying packets including media signals. Conveniently, the aggregate bandwidth of the received service conveying packets received by the top tier system exceeds the aggregate bandwidth of each set of group associated service conveying packet.

The invention provides a method for dynamic provision of service conveying packets to group of end-users, each group of end-users is coupled to the system via a bandwidth limited media, wherein the selection is responsive to requests from end-users to receive requested service conveying packets. Conveniently, the step of selecting including selectively compressing media service conveying packets such that the aggregate bandwidth of group associated service conveying packets does not exceed the bandwidth of the limited bandwidth media.

Conveniently, the step of selecting including selecting session requests, for executing a session in which group associated service conveying packets are to be provided to an associated group of end-users. Preferably, the step of selecting is preceded by a step of allocating system resources for providing the group associated service conveying packets.

The invention provides a method for dynamic provision of service conveying packets to group of end-users, each group of end-users is coupled to the system via a bandwidth limited media, at least some of the service conveying packets being media service conveying packets; the method including the steps of: receiving non-addressable service conveying packets from an input port selected from at least one non-addressable stream input port; dynamically selecting group associated service conveying packets out of the received service conveying packets to be provided to at least one of a plurality of non-addressable stream output ports; whereas at least one non-addressable stream output port is coupled to at least one group of end-users; and directing said non-addressable service conveying packets packet to said selected non-addressable stream output port.

Conveniently, the selection is responsive to the type and identity of said selected input port and the identity information embedded in said received packet. Preferably, said input port is further selected from at least one addressable stream input port.

According to an aspect of the invention the method further includes at least one step out of the following steps:

the step of prioritizing the direction of the session associated with said received service conveying packet; the step of encapsulating said conveying packet in a non-addressable stream packet, when said conveying packet is received from one of said at least one addressable stream input ports; the step of encapsulating said conveying packet in an addressable stream packet, when said conveying packet is received from one of said at least one non-addressable stream input ports; the step of stream processing said packet.

According to an aspect of the invention, the broadband media system has multiple-port router, and is configured to dynamically provide multiple services out of a very large number of services to multiple service groups. The multi-port structure of the broadband multimedia system simplifies and reduces the cost of such a configuration.

The following are definitions, which are used throughout the description of the disclosed technique:

DVB/ASI and DHEI are examples for digital video (MPEG) transmission specifications. The disclosed technique provides examples, which include DVB/ASI modules. It is noted that these DVB/ASI modules, can be replaced by equivalent modules, such as DHEI modules, and the like.

DOCSIS is a data over cable transmission specification. CMTS denotes cable modem termination system, which is conventionally used for DOCSIS. MPEG denotes a family of media (especially video and audio) decoding and multi-plexing specifications where ISO/IEC 11172 is also called MPEG-1 and the ISO/IEC 13818 is also called MPEG-2.

For convenience of explanation it is assumed that both digital services and analog services, such as digital television and analog television channels can be switched across the same local paths of each Broadband Multimedia Systems (BMS). It is noted that for the purpose of the invention analog and digital services can be conveyed over distinct paths. For example, while digital service signals are down converted and passed across a packet switching router, such as router 116, analog service signals can remain in a high frequency form, such as RF form, to be later combined with up-converted digital service signal that outputted the router.

Figure 3A:
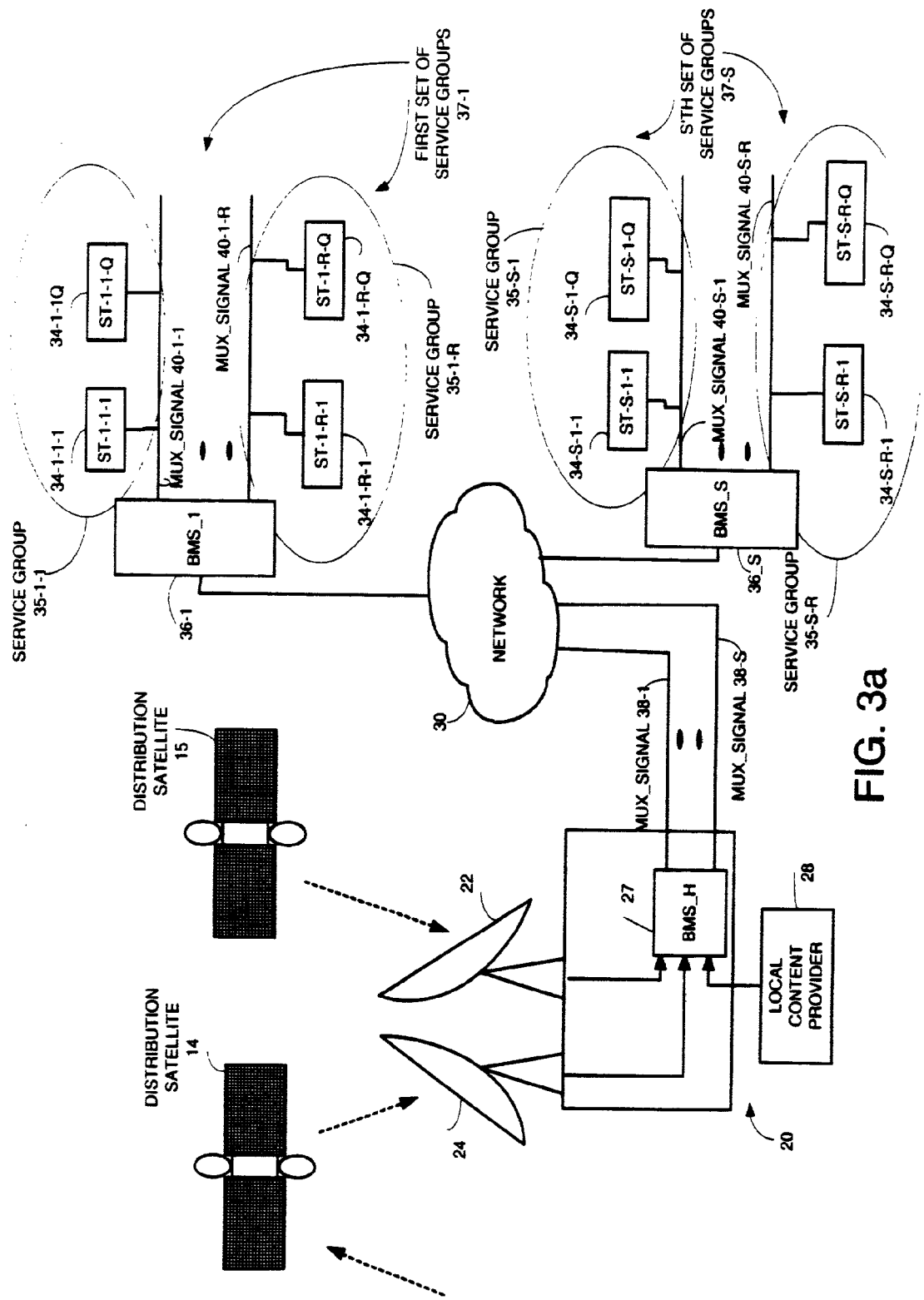
FIGS. 3*a*–3*c* are schematic illustrations of distribution and management systems coupled to a plurality of sets of service groups, constructed and operative in accordance with preferred embodiments of the present invention.
Figure 3B:
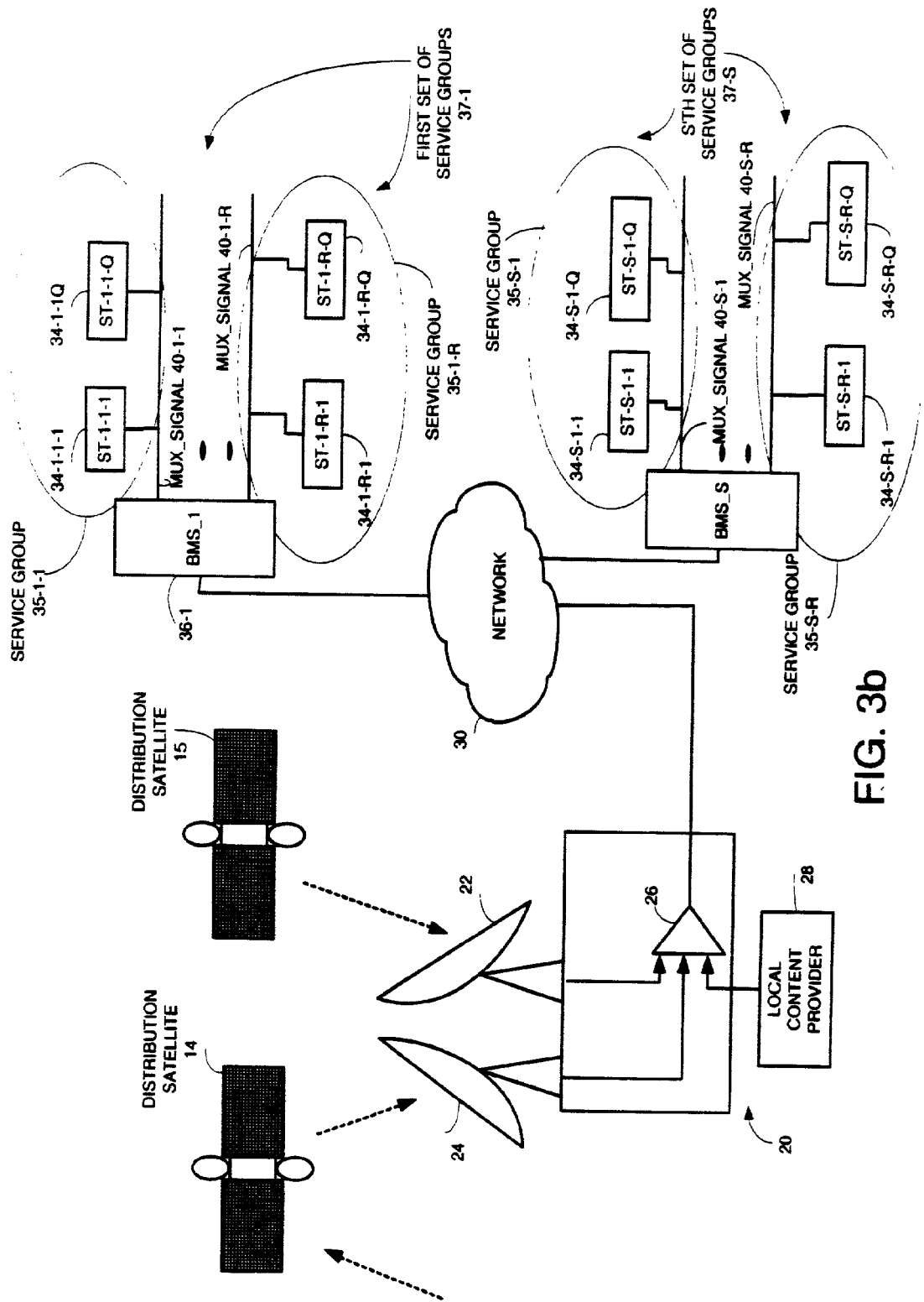
Figure 3C:
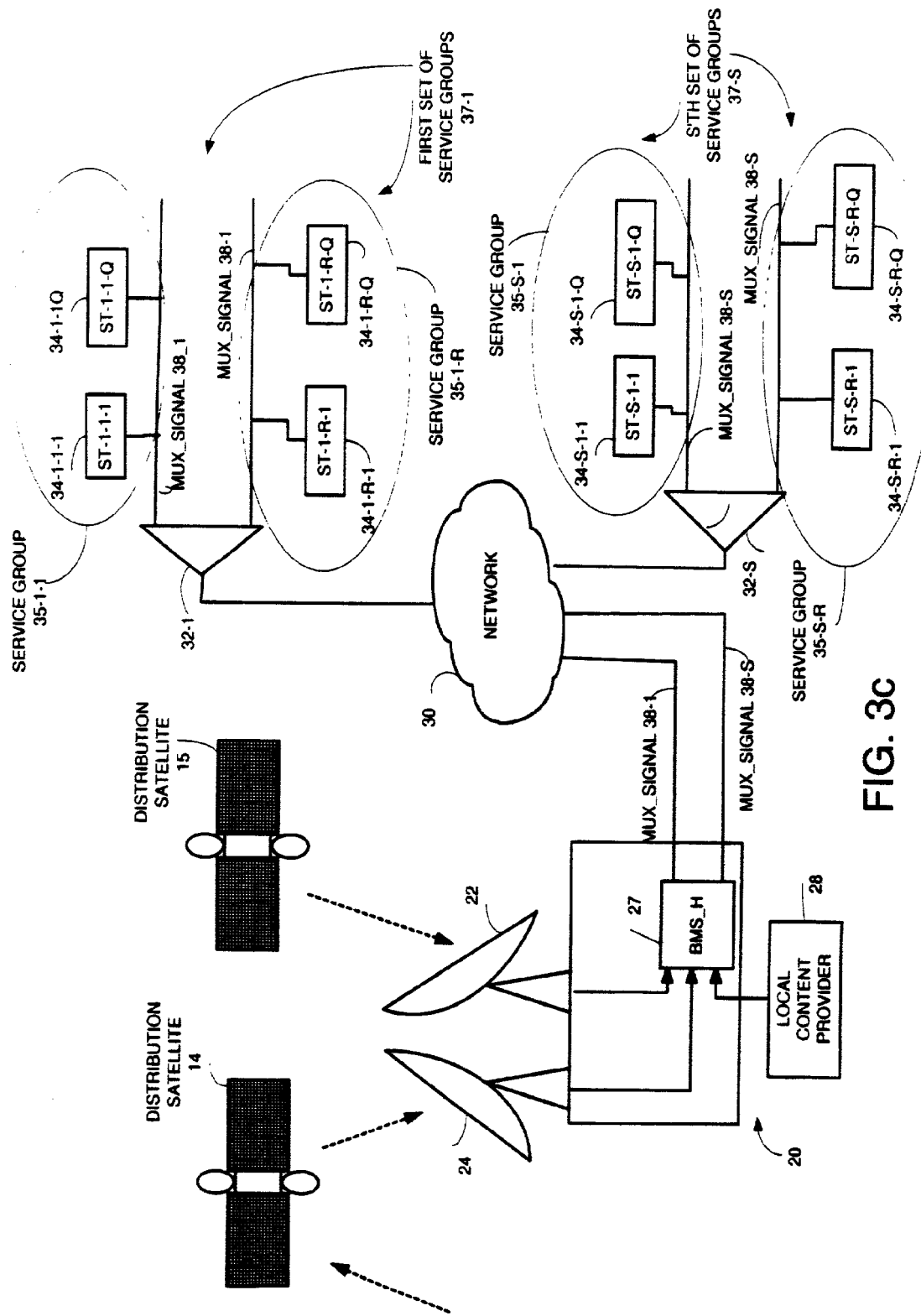

Referring to FIGS. 3a–3c, illustrating distribution and management systems, such as the BMS, coupled to a plurality of sets of service groups, constructed and operative in accordance with preferred embodiments of the present invention. The BMS can be functionally located within the local distribution centers and/or within hubs. In FIG. 3a BMS-H 27 is functionally located within local distribution center 20 and each of BMS-s 36-s are functionally located within each hub. BMS-s 36-s is coupled to the s'th set of service groups 37-s, via broadband networks, such as HFC, DSL networks and the like, and is configured to provide each service group 35-s-r of the s'th set of service groups 37-s a distinct content. For convenience of explanation the multi-plexed signal provided to the r'th service group of the s'th set of service groups is denoted MUX_SIGNAL 40-s-r. MUX_SIGNAL 40-s-r includes a plurality of group associated service conveying packets to be provided to the service group 35-s-r during at least one session.

BMS-H 27 is configured to provide each of BMS-s 36-s a distinct multiplexed signal, denoted MUX_SIGNAL-s. MUX_SIGNAL-s includes a plurality of set of group associated service conveying packets to be provided to set of service groups 37-s during at least one session. Each of BMS-H 36-s is configured to receive MUX-SIGNAL-s 38-s, and to select out of MUX_SIGNAL-s 38-s a plurality of multiplexed portions, each portion to be provided to a distinct service group out of the R service groups of the s'th set of service groups coupled to BMS-s 36-s. BMS-s 36-s are usually further adapted to receive additional signals, such as data signals, media signals, advertisement signals and the like from local content providers, such as hub content provider 50-1 of FIG. 4b, and to add the additional signals to the multiplexed portions to provide MUX-SIGNAL 40-s-r. MUX-SIGNAL 40-s-r includes a plurality of group associated service conveying packets. Each of BMS-s 36-s is further configured to receive upstream data from the members of each service group. The upstream signals can be provided to BMS-H 27 or to other networks or units coupled to BMS-s 36-s. As further illustrated the upstream signals can include television channel requests. The downstream information can include service selection information, such as television channel selection information for selecting a television channel.

In FIG. 3b BMS-s 36-s are functionally located within hubs, whereas headend 20 includes combiner 26. In FIG. 3c, BMS-H 27 is functionally located within local distribution center 20, while splitters 32-s are located within the hubs. Locating BMS-s 36-s within the hub allows for providing distinct content to each service group coupled to the hub. Locating BMS-H 27 within headend 20 allows better utilization of the bandwidth of network 30 that is used to couple local distribution center 20 to each of the hubs.

Network 30 usually has a larger and even much larger bandwidth than the bandwidth of the broadband networks that are coupled to the end-users/members of a service group, and accordingly can support a transmission of plurality of signals destined to all the service groups. Network 30 can have various configurations, such as a mesh, star and ring configuration. Network 30 can utilize various communication schemes such as Asynchronous Transfer Mode, Frame Relay, Ethernet, Gigabit Ethernet, SONET, WDM, packet switched WDM and the like. BMS coupled to network 30 have a plurality of interfaces, such as network interface unit 117 of FIG. 4a, for interfacing with network 30. Usually, as the bandwidth of network 30 is much higher than bandwidth of the broadband networks coupled to the service groups. Accordingly, various signals that are transmitted out of band over the broadband networks coupled to the service groups may be transmitted in-band over network 30.

According to an aspect of the invention, each service group receives a distinct service group signal, such as MUX_SIGNAL 40-s-r of FIGS. 3a and 3b. The service group signals includes a plurality of analog television channels and a plurality of digital television channels. When a member of the service group requests to receive a selected digital television channel, BMS-s 36-s, which is coupled to the member, checks if the selected digital television channel can be provided to the member. Usually, if the selected television channel is included within MUX_SIGNAL 40-s-r the member is provided with the selected digital television channel. If the selected channel is not included within MUX_SIGNAL 40-s-r, BMS-s 36-s determines whether the selected digital television channel can be provided to the service group of the member. If the answer is "yes" BMS-s 36-s sends a request to BMS-H 27 to receive the selected digital television channel. BMS-H 27 determines whether the selected digital television channel can be provided to BMR-s 36-s and if the answer is "yes", the selected digital television channel is provided to the member vis BMS-H 27 and BMS-s 36-s.

If the members of a service group request to receive more digital television channels than can be provided to the service group, BMR-s 36-s are configured to select which digital television channels to provide to the members of the service group. The selection can be based upon various parameters that can be previously determined, reflect real time status and reflect previous status of the group of service, group of service members, set of group of service and the like. The priority attached to each digital television channel can reflect various parameters such as the amount of service group members requesting a digital television channel, the entity of service group members requesting the digital television channel, the digital television channels provided to at least one other service group, members profile, service group profile, pervious digital television channel selections, statistical information relating to the reception of digital television channels and a duration of watching the received digital television channel, momentarily correlation between the digital television channel content and the content provided by local content providers, such as commercials and the like, profile, service group profile, pervious selections, statistical information relating to the popularity of digital television channels, and the like.

Each BMS-s 36-s is coupled to the members of the s'th set of service groups 37-s via a broadband network. A broadband network can be either wired or wireless, such as an HFC network, a DSL network, satellite communication and the like. The examples set forth interfaces an HFC network and hence includes specific cable related modules. For example, a network transmitter in the context of an HFC would be a QAM unit. These specific modules have to be replaced with equivalent modules, when operating on other types of broadband networks. The broadband networks are illustrated in FIGS. 3a–3c as a plurality of horizontal and vertical lines that coupled BMS-s to the members of the s'th set of group of services.

Reference is now made to FIGS. 5a–5d, which are schematic illustration of MUX_SIGNAL 38-S provided from BMS-H 27 to BMS-S 36-S, of MUX_SIGNAL 38-1 provided from BMS-H 27 to BMS-1 36-1, of MUX_SIGNAL 40-1-1 provided from BMS-1 36-1 to service group 35-1-1, and of MUX_SIGNAL 40-S—R provided from BMS-S 36-S to service group 35-S—R, in accordance with preferred embodiments of the present invention. MUX_SIGNAL 38-S includes content that is destined to all members of the S'th set of service groups 37-S. MUX_SIGNAL 38-1 includes content that is destined to all members of the first set of service groups 37-1. MUX_SIGNAL 40-1-1 includes content that is destined to all members of the first service group 35-1-1 of the first set of service groups 37-1. MUX_SIGNAL 40-S—R includes content that is destined to all members of the R'th service group 35-S—R of the S'th set of service groups 37-S. It is noted that the scale of FIGS. 5c and 5d does not have to be the same scale of FIGS. 5a and 5b.

MUX_SIGNAL 40-S—R is carried over a HFC network that has a limited bandwidth of 750 Mhz. Upstream signals transmitted from the members of service group 35-S—R to BMS-S 36-S are located at 0–50 Mhz. A plurality of analog television signals in 6-Mha channels that can be currently viewed by the members of service group 35-S—R are present at 50–500 Mhz. A plurality of digital television signals that can be currently viewed by these members are present at 500–750 Mhz. MUX_SIGNAL 40-1-1 is analogues to MUX_SIGNAL 40-S—R but its downstream/upstream content is provided to/received from the members of service group 35-1-1.

MUX_SIGNAL 38-S is carried over network 30 that has very large bandwidth. Conveniently, the bandwidth of network 30 is much larger than 750 Mhz. Upstream signals transmitted from the BMS-S 36-S to BMR-H 27 are located at a first frequency range that conveniently exceeds the 0–50 Mhz range. A plurality of analog television signals in 6-Mhz channels that can be currently viewed by the members of the S'th set of service group 37-S are present at a second frequency range that conveniently exceeds the 50–500 Mhz range. A plurality of digital television signals that can be currently viewed by these members are present at a third frequency range, that conveniently exceeds the 500–750 Mhz range. MUX_SIGNAL 38-1 is analogues to MUX_SIGNAL 38-S but its downstream/upstream content is provided to/received from BMS-1 36-1.

Figure 4A:
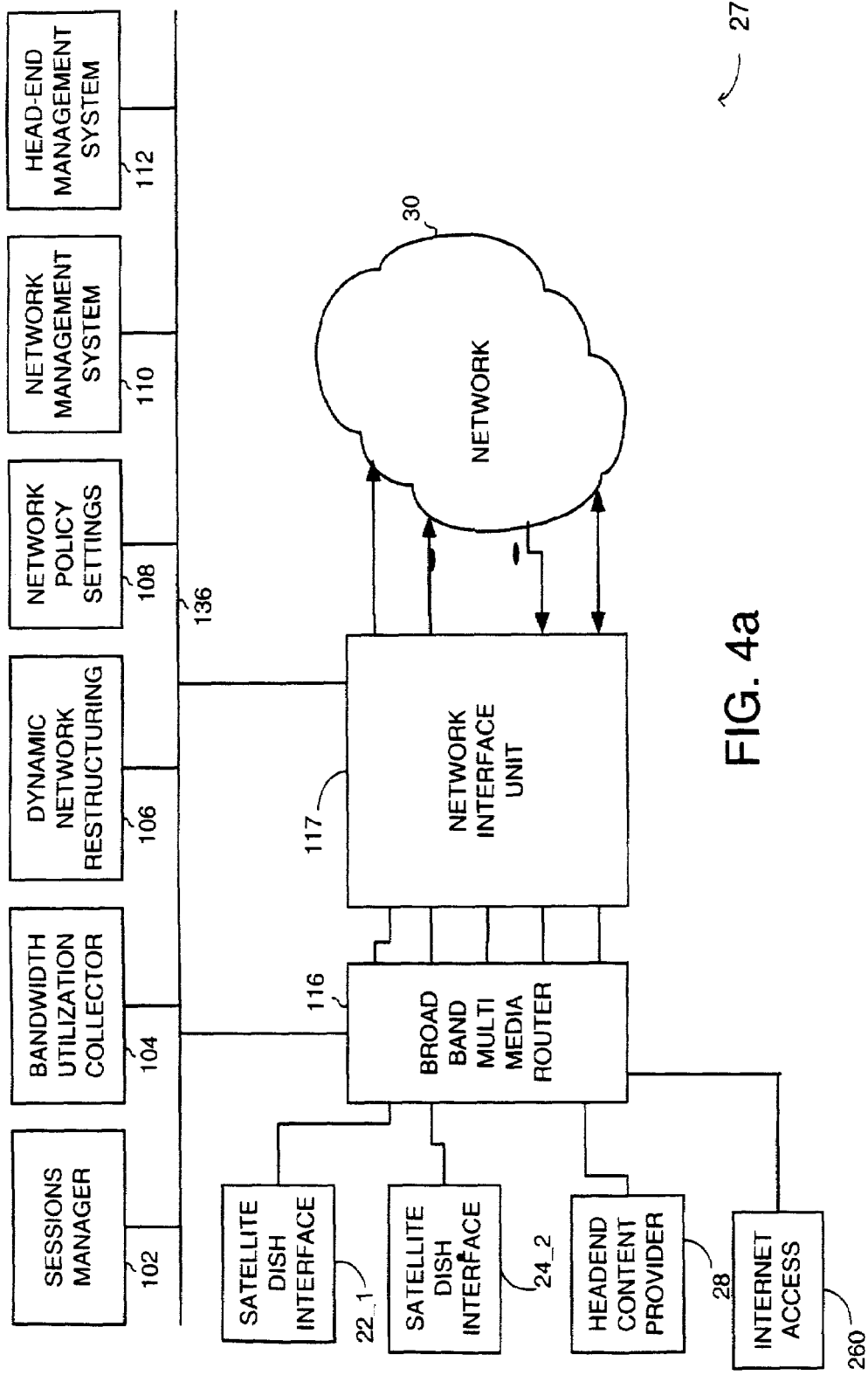
FIGS. 4a–4b are schematic illustrations of Broadband Multimedia Systems, constructed and operative in accordance with preferred embodiments of the present invention.
Figure 4B:
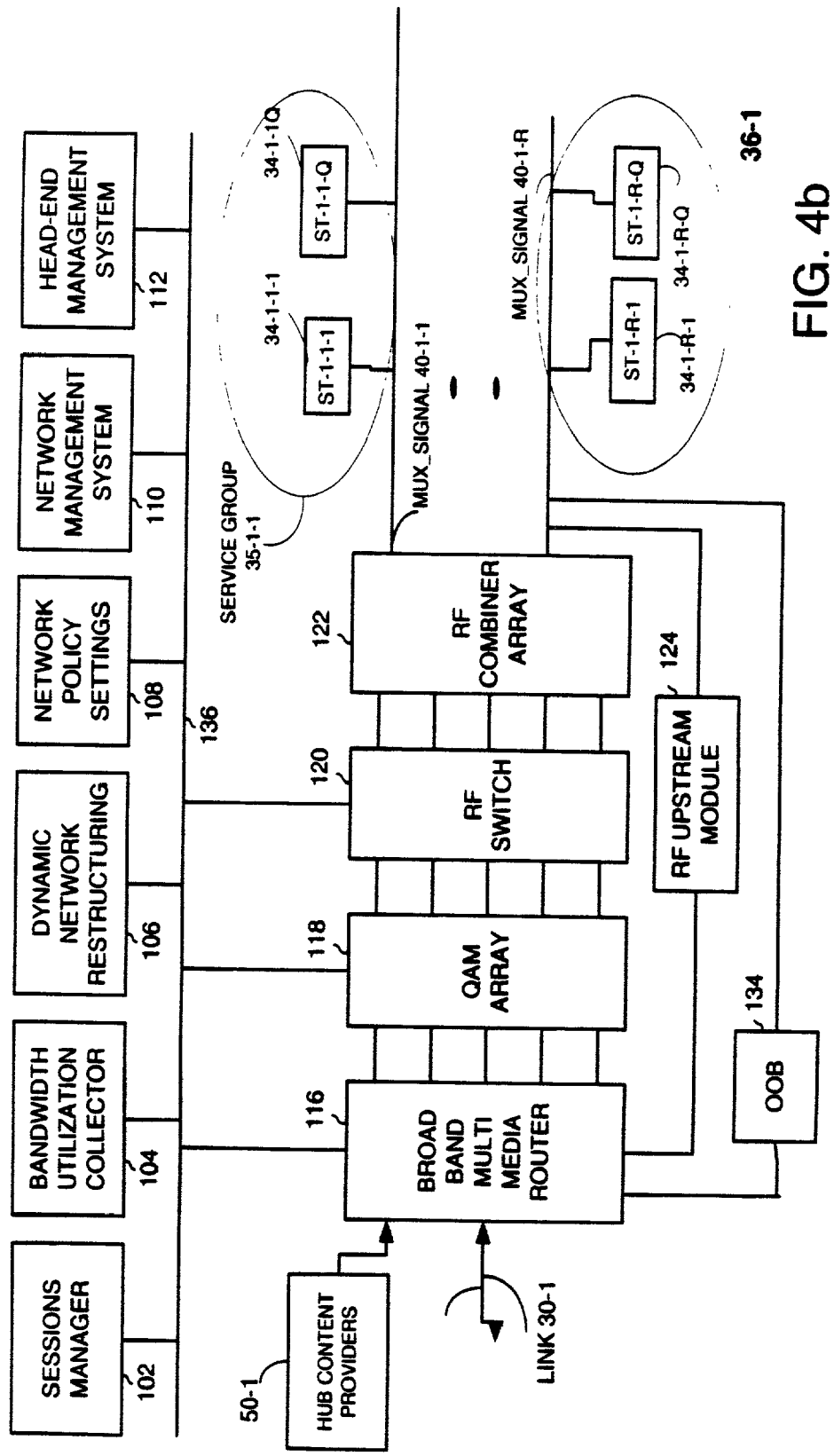

Reference is now made to FIGS. 4a and 4b, which are schematic illustration of BMS-H 27 being functionally located within headend 20 and of BMS-1 36-1 being functionally located within the first hub out of s hubs coupled to headend 20, constructed and operative in accordance with preferred embodiments of the present invention.

BMS-1 36-1 includes a logical communication bus 136, a session manager unit 102, a bandwidth utilization collector 104, a dynamic network restructuring unit 106, a network policy settings unit 108, a network management system 110, a broadband multimedia router 116, a QAM array 118, an RF switch 120, an RF upstream module 124, an RF combiner array 122, an Out-Of-Band unit 134, and a head-end management system 112. BMS-1 36-1 is coupled to network 30 via communication link 30-1, and to a plurality of local content providers and receivers, such as hub content provider 50_1 for receiving the mentioned above additional information signals.

Session manager unit 102, bandwidth utilization collector 104, dynamic network restructuring unit 106, network policy settings unit 108, network management system 110, and head-end management system are connected to the logical communication bus 136. Broadband multimedia router 116 is connected to communication link 30-1, to hub content provider 50-1, to logical communication bus 136, RF upstream module 124 and to QAM array 118. RF switch 120 is connected to logical communication bus 136, QAM array 118 and to RF combiner array 122. RF upstream module 124 is connected to broadband multimedia router 116, and to the first set 37-1 of service groups via an HFC network. RF combiner array 122 is further connected to Out-Of-Band unit 134 and to to the first set 37-1 of service groups via an HFC network.

Session manager unit 102 receives and approves session requests, processes them and provides routing parameters to the broadband multimedia router 116. Broadband multimedia router 116 receives MUX_SIGNAL 38-1 from communication link 30-1. MUX_SIGNAL 38-1 includes a plurality of media streams such as but not limited to digital television channels and analog television channels. It is noted that such media streams can include video streams, audio streams, data streams, individual data packets and the like. Such streams can be received over video channels, such as ones operative according to MPEG transport interfaces, or over data channels, such as TCP/IP Ethernet communication lines.

The routing parameters produced by session manager 102, specify input and output routing commands for broadband multimedia router 116, to operate there according. It is noted that a conventional MPEG transport stream does not include routing information such as destination or origin, rather just limited identification information, known as PID (Packet Identification) The disclosed technique overcomes this disadvantage as will be described in detail in conjunction with FIGS. 10a and 10b. Broadband multimedia router 116 forwards packets from a selected input port to a specified output port, according to either routing information embedded in the routed packet, or according to the routing parameters, associated with that routed packet.

According to the disclosed technique, each session entering the system has to be approved, and hence can also be denied. The session manager 102 receives session initialization requests from a variety of media sources, such as application servers, end-users, and additional modules. The session manager 102, determines if these requests are compatible with each of a plurality of policy types and available resources, and determines whether or not to approve or deny these requests. According to a preferred embodiment of the invention, one type of session request indicates that a member of a service group requests to view a television channel.

The session manager unit 102 uses bandwidth parameters stored in bandwidth utilization collector 104, regarding the current bandwidth utilization. The session manager 102 accesses network policy settings unit 108, to determine if a selected initialization request conforms to various network policies. A network policy can virtually include any condition, which applies to the content, type, source, destination, network, and the like, which are included in the session initialization request. For example, selected types of sessions are denied for a selected node, when the bandwidth usage at that node, exceeds a predetermined value. In another example, a network policy can include a condition, which does not allow X-rated movies to be transmitted to selected end-users, at predetermined hours of the day. A further example for a network policy can include a condition where a selected source can only provide services to selected users, and not to others, and the like. The session manager further accesses network management system 110, for determining if there are malfunctions in selected parts of the network. According to a preferred embodiment of the invention, a network policy defines a group of digital and analog television channels that can potentially be provided to the members of the s'th set of service groups coupled to BMS-1 36-1. The content of the group can be dynamically configured, in view of the behavior patterns, and/or requests of the members.

Broadband multimedia router 116 is connected to communication link 30-1 and to hub content provider 50-1 and is configured to direct data from them to the appropriate output ports. QAM array 118 includes a plurality of QAM units (not shown), each receiving DVB/ASI media information and transmitting it modulated over an RF channel, connected thereto.

RF combiner array 122 includes a plurality of RF combiners (not shown), each operative to receive a plurality of RF channels and produce a single, multi-band RF signal, therefrom. The amount of QAM units usually is much larger than the amount of RF combiners. The RF switch 120 is operative to route RF channels from each port therein, to each other port therein. Hence, RF switch 120 can connect each QAM of QAM array 118 to each RF combiner of RF combiner array 122, and thus, dynamically control network RF resources. Dynamic network restructuring unit 106 controls each of the QAMs, thereby determining which frequencies that QAM shall modulate to. Dynamic Network Restructuring unit 106 further controls RF switch 120, such that the signals received from each of the QAMs are directed to a selected one of the RF combiners. Hence, Dynamic Network Restructuring unit 106 provides dynamic restructuring of the RF portion of the network. Each of the RF combiners receives channels in frequencies that have been transmitted from the QAM through RF switch, and combines them on a single line connected to members of a service group via HFC network communication link. This direction is called downstream. Members can include DOCSIS compatible cable unit, non-DOCSIS compatible cable units, cable units that have different paths for video signals and for data signals, cable units that have a single path, and the like. Cable units that have a single path can receive narrow cast data that is submitted In-Band, as illustrated at U.S. patent application Ser. No. 09/595,624 filed at Jun. 16, 2000 of Oz et al, which is incorporated in its entirely by reference. A cable unit can be a set-top box, a computer, a cable modem and the like.

According to the present invention, end-user equipment is also capable of transmitting data. This direction is called upstream. RF upstream module 124 receives signals from the end-user equipment, and performs down-conversion and demodulation thereof. RF upstream module 124 can further include an RF switching mechanism, which optimizes the usage of the upstream direction, and hence can further enhance the operation of BMS-1 36-1. The Out-Of-Band (OOB) module 134 communicates with each of the targets of that upstream information in the Head-end, thus providing a reverse channel from HFC network 128 to Head-end. The transmitted data can include television channel request. According to another aspect of the invention OOB module 134 is also used from transmitting downstream information.

BMS-H 27 of FIG. 4a is analogues to BMS-1 36-1 of FIG. 4b but is coupled to network 30, and has network interface unit 117 instead of RF upstream module 124, OOB 134, QAM array 118, RF switch 120 and RF combiner array 122. Broadband multimedia router 116 is coupled to satellite dish interfaces 22_1 and 24_1 for receiving signals from satellite dishes 22 and 24 accordingly, and is coupled to additional content providers and receivers, such as headend content provider 28 and internet access interface 260.

As the bandwidth of network 30 exceeds the bandwidth of broadband networks such as HFC networks, all the signals can be transmitted in-band over network 30. QAM array 118, RF switch 120 and RF combiner 122 that are used when a BMS is coupled to an HFC network can be replaced by a transmission array within network interface unit 117 that is configured to provide network 30 compatible signals. Network interface unit 117 further includes receivers for receiving upstream signals. Network interface unit is managed by DNR unit 107, that is analogues to DNR unit 106, but is configured to manage the resources of network interface unit 117.

Figure 6A:
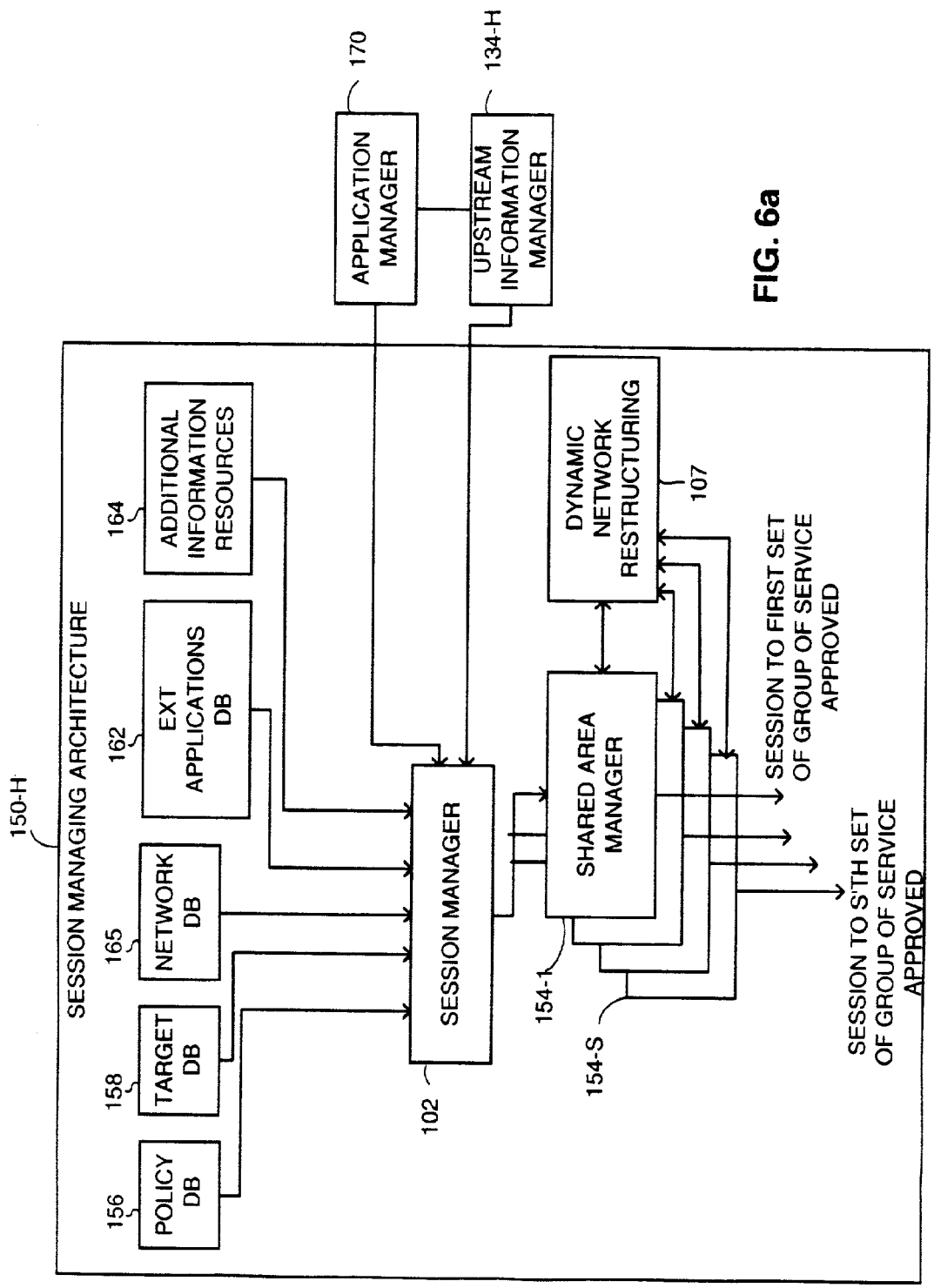
FIGS. 6a–6b are detailed schematic illustrations of session managing architectures, constructed and operative in accordance with another preferred embodiments of the present invention.
Figure 6B:
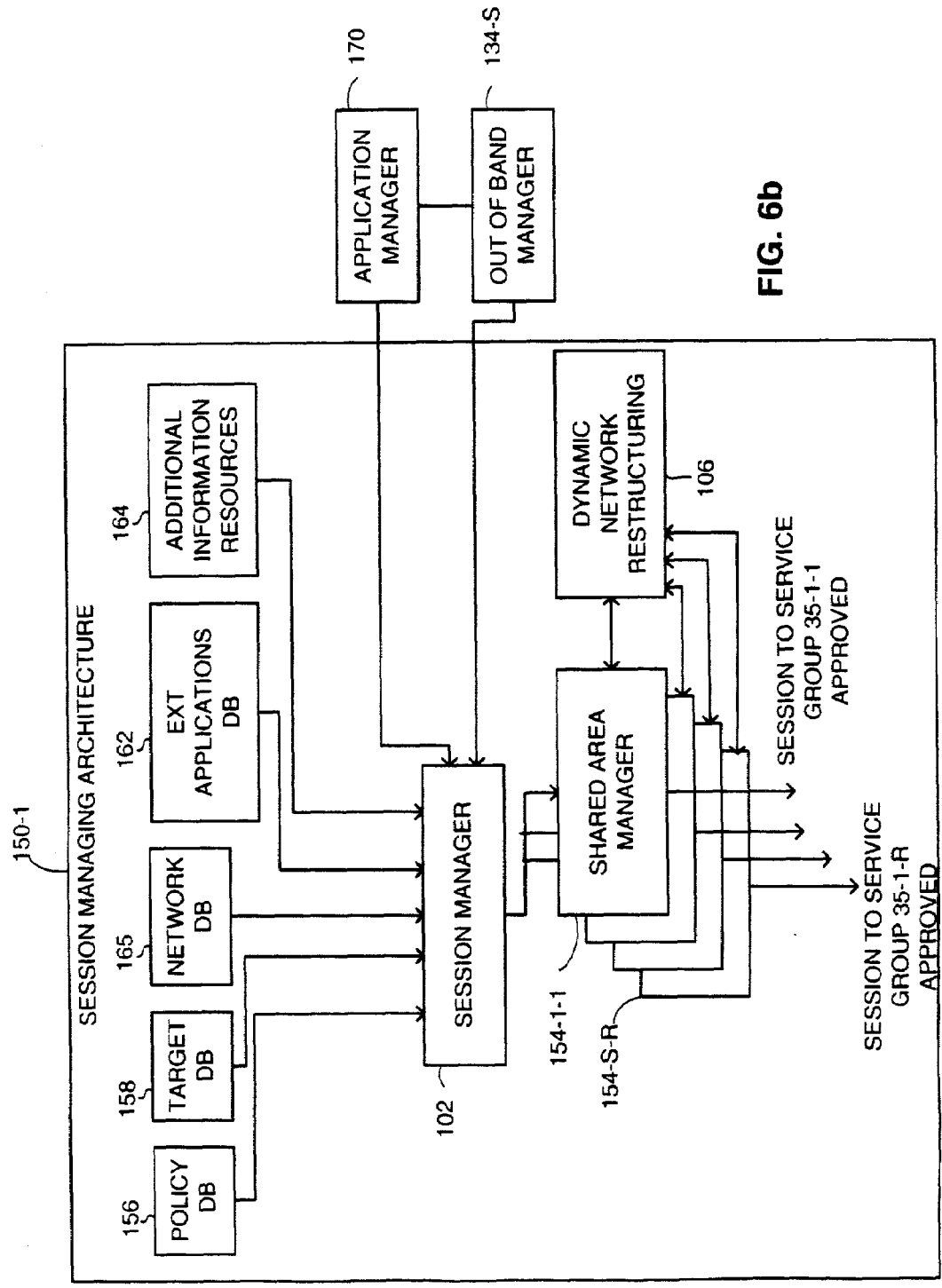

Reference is now made to FIGS. 6a–6b, which are detailed schematic illustrations of session managing architectures, generally referenced 150-H and 150-1, accordingly, constructed and operative in accordance with another preferred embodiment of the present invention. Session managing architecture 150-1 is described in conjunction with system 36-1 of FIG. 4b.

Architecture 150-1 includes session manager 102 (FIG. 4b), R shared area managers 154-1-r, r ranges between 1 to R, a policy database 156, a target database 158, a network database 160, an external applications database 162, and an additional information resources 164. Architecture 150 further includes a Dynamic Network Restructuring Manager (DNR) 106 (FIG. 4b), an application manager 170, and an Out-Of-Band manager 134 (FIG. 4b).

Policy database 156 is a general policy database which includes a plurality of policy records specifying rules, such as what kind of information can be transmitted in the system, from which sources, to which targets, at what time, and the like.

Target database 158 includes a plurality of target records. A target record can include information related to policies related to the target, network topological location of the target, and the like.

Network database 160 includes a plurality of network policy records. A network policy can include restrictions regarding overall usage of the network, such as a predetermined minimal transmission quality level for selected portions of the network, scheduling schemes for allocating selected portions of the network for specific services, and the like.

External applications database 162 includes a plurality of external application records specifying data on these applications, such as what is allowed or forbidden for these applications, and how are these applications connected to the system.

Each shared area manager 154-1-*r* manages the bandwidth utilization for the members of the r'th service group of the first set of service groups 37-1, using end point equipment, which can include DOCSIS cable units, non-DOCSIS cable units, digital television sets, and the like. It assigns the optimal channel to the session. According to a preferred embodiment of the invention each shared area manager monitors services, such as television channels and the like that are provided to the members of associated service group and can determine whether a requested service is already provided to the member, whether the requested service can be provided to a member of the service group and whether there is a need to request to receive the channel from BMS-H 27.

Session manager 102 is connected to shared area managers 154-*r*, policy database 156, target database 158, network database 160, external applications database 162, additional information resources 164, application manager 170, and Out-Of-Band manager 134. Application manager 170 is further connected to Out-Of-Band manager 134. Shared area manager 154 is further connected to DNR manager 106.

As stated above, session manager 102 is operative to approve or deny session initialization requests to system 36-1 (FIG. 4*b*). Session manager 102 receives an init-session request either from the application manager 170, or from the Out-Of-Band manager 134.

Session managing architecture 150-H of FIG. 6*a* is analogues to session managing architecture 150-1 of FIG. 6*b*, but has a plurality of shared area managers 154-1-154-S instead of shared area managers 154-1-1-154-1-R and does not have Out-Of-Band manager 134. Each shared area manager 154-*s* manages the bandwidth utilization for the s'th set of service group. The difference between the shared area managers of FIGS. 6*a* and 6*b* is further illustrated by the following example: Shared area manager 154-1-1 checks that the bandwidth of MUX_SIGNAL 40-1-1 does not exceed the available bandwidth of the HFC network communication link that couples BMS-1 36-1 to the members of the first service group 35-1-1 of the first set of service groups 37-1. If the bandwidth of the MUX_SIGNAL 40-1-1 is less than the available bandwidth then additional sessions can be approved. During such a session data and/or media signals can be provided to members of service group 35-1-1. Shared area manager 145-1 checks that the bandwidth of MUX_SIGNAL 1 38-1 does not exceed the available bandwidth of network 30 for transmissions from BMS-H 27 to BMS-1 36-1.

Figure 6C:
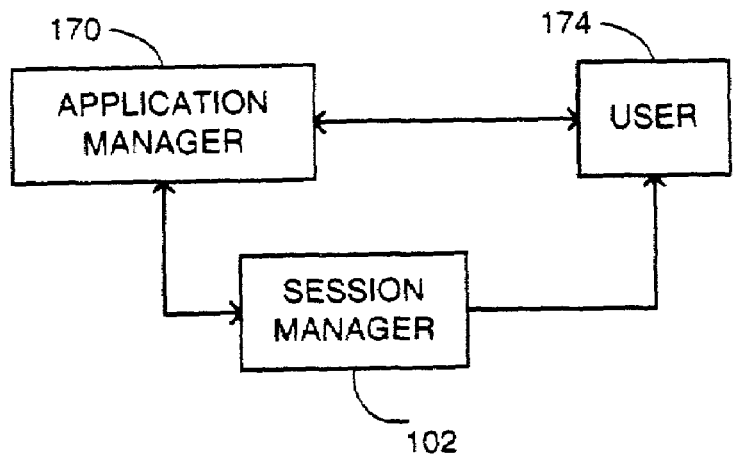
FIGS. 6c–6d are schematic illustration of session request examples, in accordance with further preferred embodiments of the present invention.
Figure 6D:
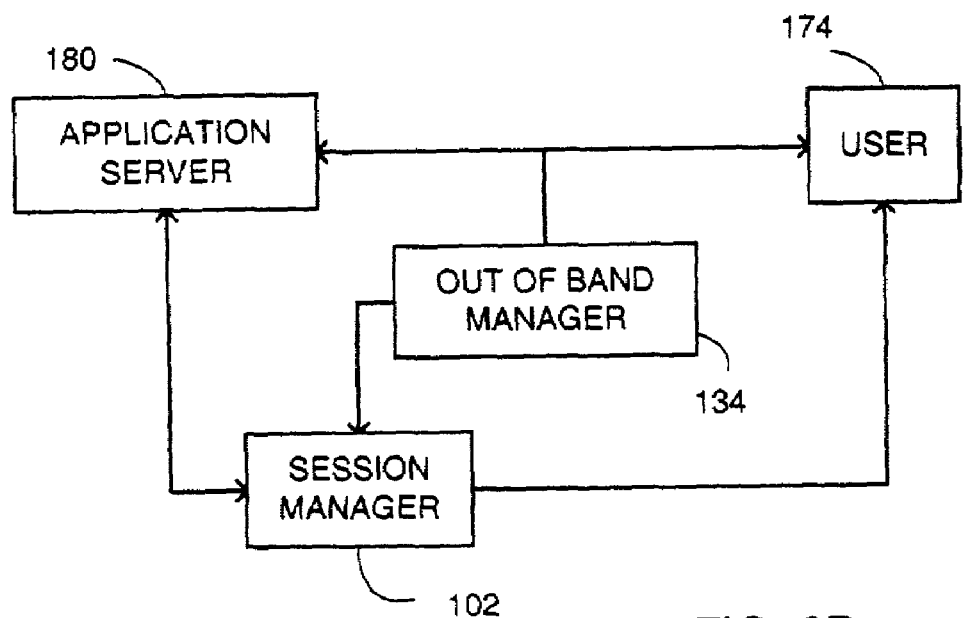

Reference is further made to FIGS. 6*c* and 6*d*. FIG. 6*c* is a schematic illustration of a session request example, in accordance with one aspect of the present invention. FIG. 6*d* is a schematic illustration of a session request example, in accordance with another aspect of the present invention. With reference to FIG. 6*c*, the session initialization request to the session manager 102, is produced by the application manager 170 either internally or in sequence with a respective user 174 request therefrom. Alternatively, with reference to FIG. 6*d*, the session initialization request can be produced by the Out-Of-Band manager 134, in sequence with a respective user request to an application server 180. This is applicable in a case where the application manager 170 is not operative to forward a session initialization request to the session manager 102. In that case, the Out-Of-Band manager 134 detects the aforementioned user request, and directs a respective session initialization to session manager 102, to obtain approval. If approval is granted, then the session manager 102 provides an initiation command to the application server 180 to start producing and providing the application for that approved session.

Session manager 102 determines if the requested session can be approved according to a plurality of parameters such as network policies, target policies, general policies, application manager policies, additional information resources, and the like. It is noted that at this stage the session is not approved yet. The session manager accesses other modules such as the shared area manager 154 and the like, receives their "approval" and only then, approves the session and provides an initiation command to application server 180. According to an aspect of the invention the current availability of a requested service cab be stored in the mentioned above databases.

After the session manager 102 approves the session, it accesses the shared area manager 154, which attempts to allocate a suitable channel therefor. If the shared area manager 154 fails to allocate such a channel, then the session manager proceeds to the DNR manager 106. Otherwise, the session manager 102 approves the session.

The DNR manager 106 performs channel and frequency switching (in hardware), and dynamically changes the amount of channels, which are dedicated to each group of nodes, according to the bandwidth usage across groups of nodes. This allocation can be dynamic as long as the total number of dedicated channels, does not exceed the maximum frequency band that is physically achievable within any specific group of nodes. If allocation fails, then the session manager 102 denies the session.

Figure 7A:
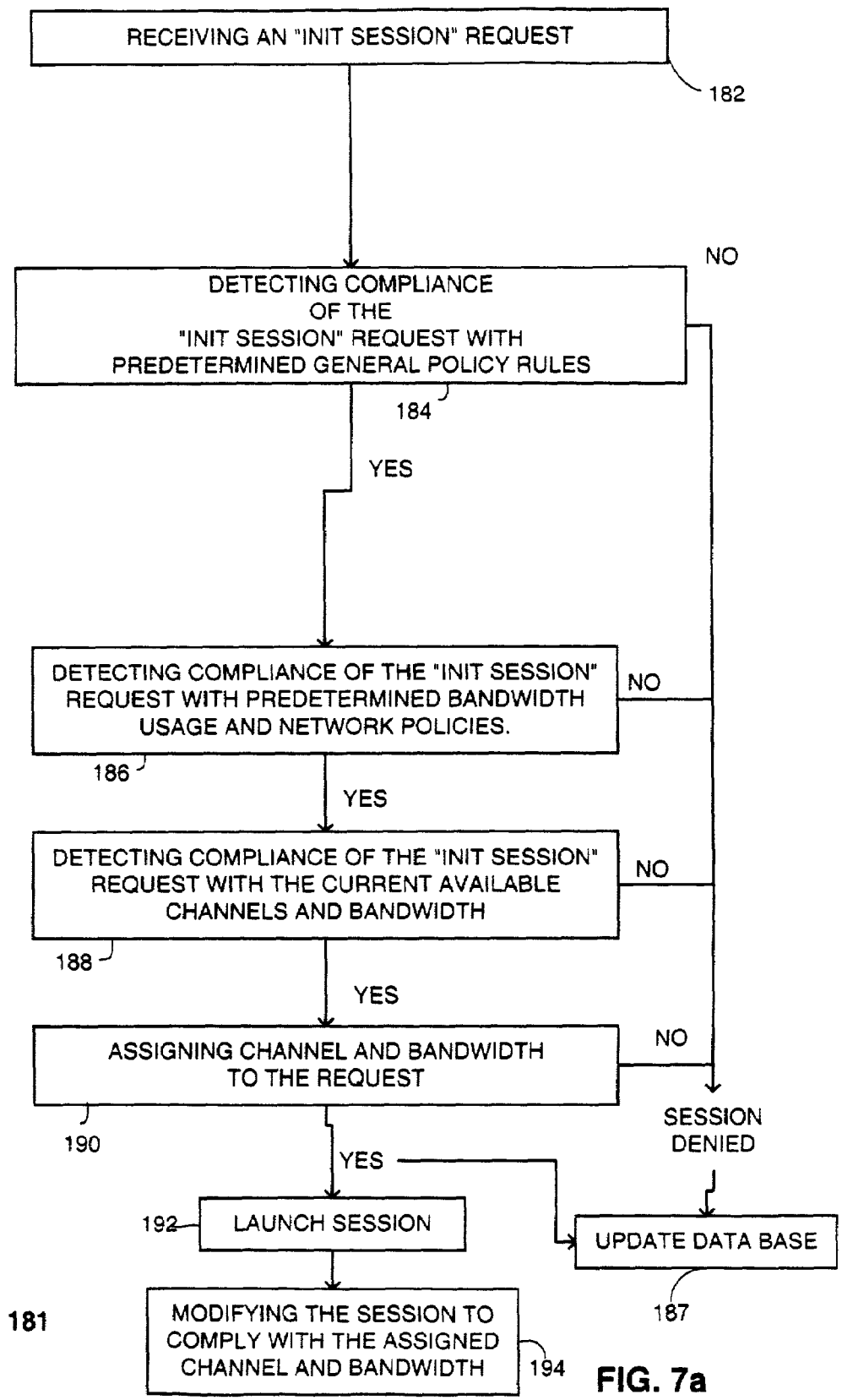
FIGS. 7a–7b are illustrations of methods for operating the session management architectures of FIGS. 6a–6b of the systems of FIGS. 4a–4b, operative in accordance with further preferred embodiments of the present invention.
Figure 7B:
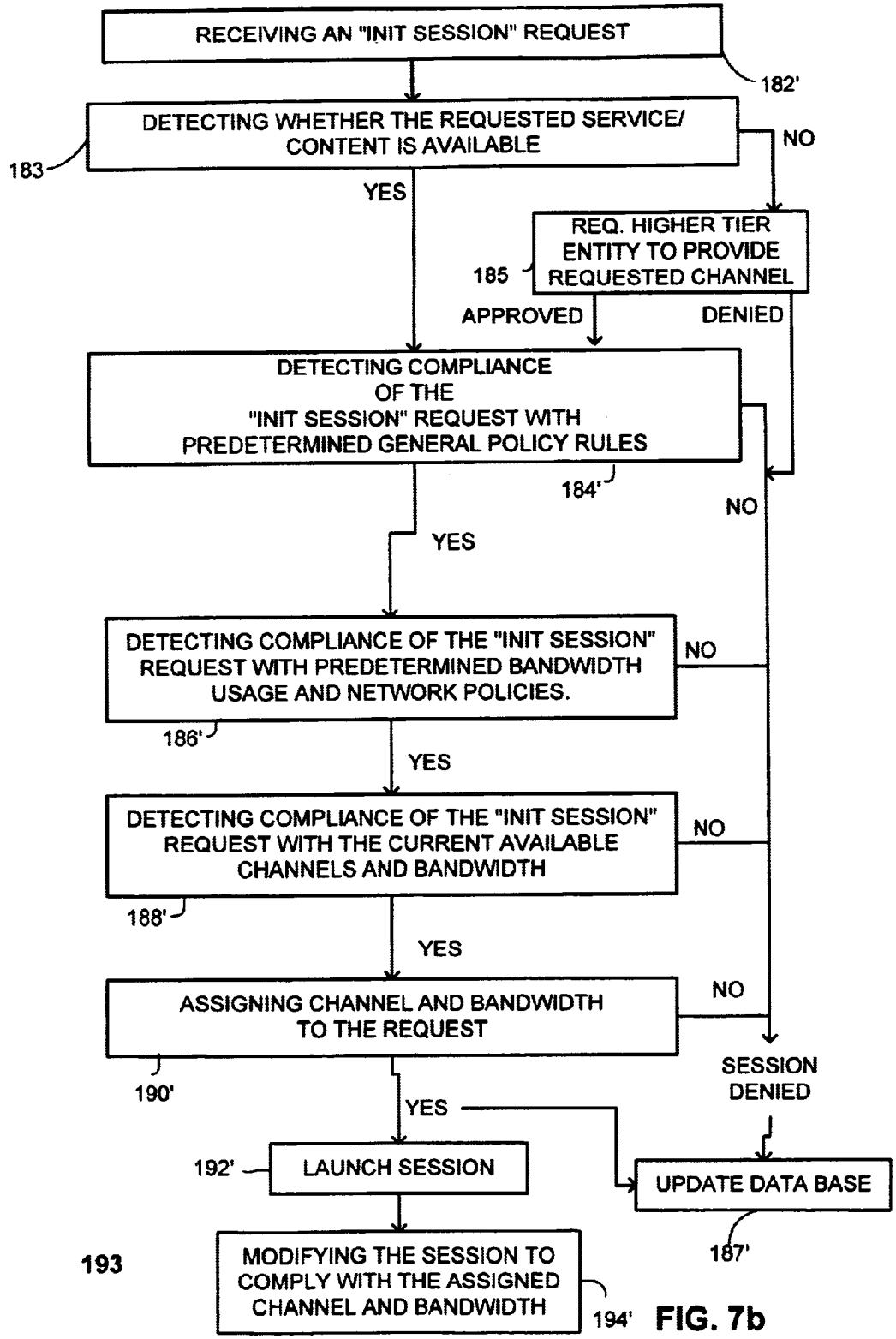

Reference is now made to FIGS. 7*a* and 7*b*, which are illustrations of method 181 for operating session management architecture 150-H (FIG. 6*a*) of BMS-H 27 (FIG. 4*a*) and of method 193 for operating session management architecture 150-1 (FIG. 6*b*) of BMS-1 (FIG. 4*b*), accordingly, operative in accordance with another preferred embodiments of the present invention. Method 181 includes steps 182, 184, 186, 188, 187, 190, 192 and 194. Method 193 includes steps 182', 184', 186', 188', 187', 190', 192', 194', 183 and 185. Steps 182', 184', 186', 187', 188', 190', and 192 are analogues to steps 182', 184', 186', 187', 188', 190', and 192 but are performed in the context of BMS-H 27, while method 193 is performed in the context of BMS-1 36-1.

Method 193 (181) of FIG. 7*b* (7*a*) starts at step 182' (182), in which a session initialization request is detected. With reference to FIG. 6*b*, session manager 102 receives an init-session request, as described herein above. An init session request can be generated by a member, of any of the first set of service groups, such as ST-1-*r*-*q* (numbered 34-1-*r*-*q*) of service group 35-1-*r*, when the user of member 34-1-*r*-*q* requests to receive a service, such as a digital television channel. If the requested session is approved then service conveying packets conveying the requested service are provided to the requesting end-user.

Step 182' of FIG. 7*b* is followed by step 183 of detecting whether the requested service/content is available. (Step 182 of FIG. 7*a* is followed by step 184). If the requested service is available, step 183' is followed by step 184', else step 182' is followed by step 185'. With reference to FIG. 6*b*, if member 43-1-*r*-*q* requests to receive a digital television channel that is included within MUX_SIGNAL 38_1 then the requested content is available.

In step 185 BMS-1 36-1 requests a higher tier entity, such as BMS-1 27 to provide the requested digital television channel. The requested digital television channel is provided during a plurality of sessions managed by BMS-1 27. If the request is approved and the required content is provided to BMS-1 36-1 then step 185 is followed by step 184', else the request is denied and step 185 is followed by step 187' of updating a data base. With reference to FIG. 6*b*, if service conveying packets of the requested service can be included within MUX_SIGNAL 38_1 then BMS-H 27 will provide them to member 34-1-*r*-*q* via BMS-1 36-1.

Conveniently, method 181 does not include steps 183 and 185 as BMS-H is the highest tier entity.

In step 184' (184), compliance of the session initialization request with predetermined general policy rules, is detected. With reference to FIG. 6*b*, session manager 102 checks compliance of the requested session with policy records of database 156. If such compliance is not detected, then the session is denied.

In step 186' (186), compliance of the session initialization request with predetermined bandwidth usage and network policies, is detected. With reference to FIG. 6*b*, session manager 102 determines if the requested session can be approved according to a plurality of parameters such as network policies in the network database 160, target policies in target database 158, general policies in the policy database 156, application manager policies in the external application database 162, additional information resources 164, and the like. If such compliance is not detected, then the session is denied.

In step 188' (188'), compliance of the session initialization request with the current available channels and bandwidth, is detected. With reference to FIG. 6*b*, shared area manager 154-*r* checks compliance of the session with channels and bandwidth, which are currently available in the potential path of the session. Said path includes the communication link coupling the members of service group 35-1-*r* to BMS-1 36-1. According to an aspect of the invention, at least some of the services provided to the members of the service groups, and especially the digital television channels are associated with a priority indication. A service can replace a lower priority service, especially when the lower priority service is provided to the members of a service group but is of no interest. For example, assuming that K1 digital television channels and K2 other lower priority services such as internet sessions, data sessions, emails and the like are provided to the members of service group 35-1-*s*, and that the members watch only K3 digital channels out of the K1 digital television channels, K1>K3. Assuming that member 34-1-*s*-*r* requests to view a digital television channel that is not included within the K1 digital television, and that the aggregate bandwidth of the K1 digital television channels, the K2 lower priority services and the requested digital television channel exceed the bandwidth of the communication link coupling the members of service group 35-1-*s* to BMS-1 36-1. The requested digital television channel can be provided to the member by denying sessions supporting the at least some of lower priority services, and/or by replacing a digital television channel that is not currently viewed by the members of service group 35-1-*s* by the requested digital television channel.

If a compliance of the session initialization request with the current available channels and bandwidth is not detected, then the session is denied. It is noted that step 188 can further include dynamic reallocating of network resources so as to make channels and bandwidth available to the requested session.

In step 190' (190), channel and bandwidth are assigned to the requested session. With reference to FIG. 6*b*, shared area manager 154 assigns channel and bandwidth to the requested session, which is then launched during step 192' (192). When the available bandwidth is narrower than the one required for the session, and the session can tolerate a reduction in quality, then, such reduction can be imposed during step 194' (194). Launching a session according to step 192' (192) includes programming the selected input module, the switch 274 and the selected output module. It is noted that the bandwidth utilization collector 104 can also be updated accordingly.

It is noted that at least one database can be updated whenever a session init request is detected, denied and/or approved. This update is done during step 187' (187). The database can be used to perform statistical analysis of the behavior patterns of members, service groups, and/or sets of service groups. The at least one database can be further used to update the priority of the requested services, such as the priorities of the digital television channels.

In further detail, the DNR manager 106 performs channel and frequency switching (in hardware), and dynamically changes the amount of channels which are dedicated to each group of nodes, according to the bandwidth usage across groups of nodes. This allocation can be dynamic as long as the total number of dedicated channels does not exceed the maximum frequency band that is physically achievable within any service group.

Figure 8A:
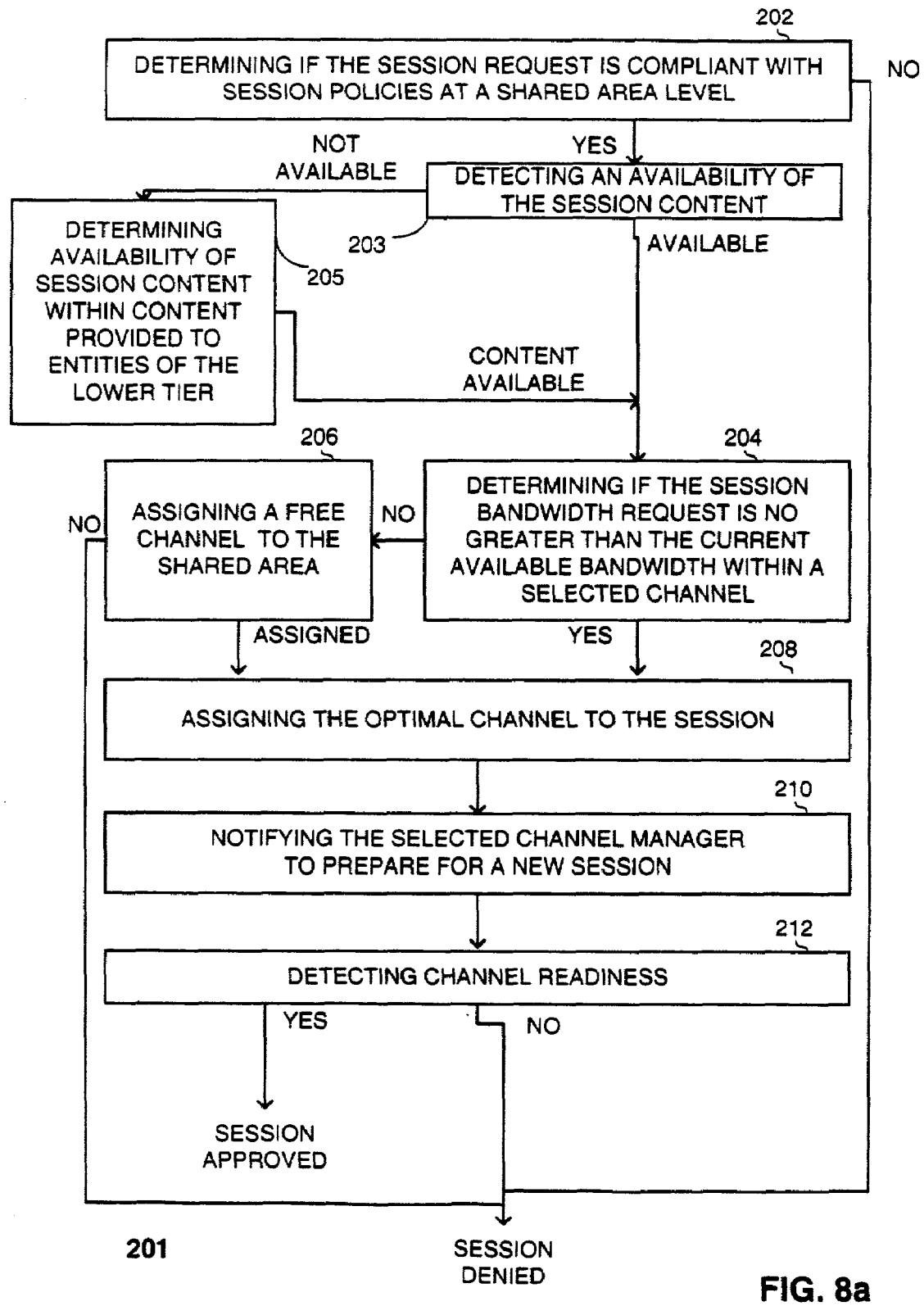
FIGS. 8a–8b are illustrations of methods for operating the area managers of FIGS. 6a–6b, operative in accordance with another preferred embodiments of the present invention.
Figure 8B:
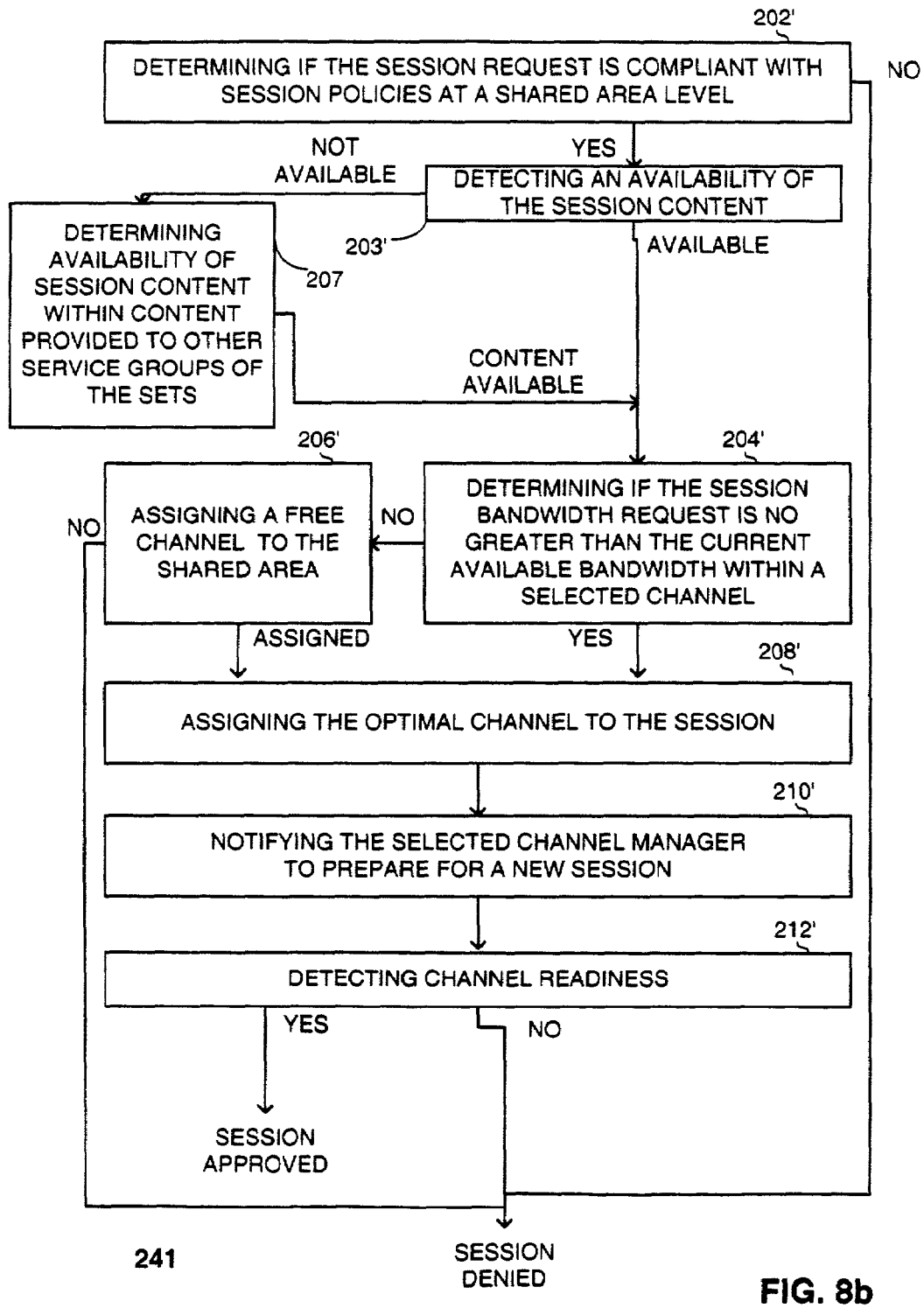

Reference is now made to FIGS. 8*a*–8*b*, which are illustrations of method 211 for operating shared area manager 154-1 of FIG. 6*a*, and of method 201 for operating shared area manager 154-1-*r* of FIG. 6*b*, respectively, operative in accordance with a further preferred embodiment of the present invention. It is noted that shared area manager 154-1-*r* is preferably a logical module, which is used to manage service group 35-1-*r*, and that shared area manager 154-1 is preferably a logical module, which is used to manage set of service group 37-1.

Method 201 includes steps 202, 203, 205, 204, 206, 208, 210 and 212. Method 211 includes steps 202', 203', 207, 204', 206', 208', 210' and 212'. Steps 202, 203, 204, 206, 208, 210 and 212 are analogues to steps 202', 203', 204', 206', 208', 210' and 212' but are perform in the context of BMS-H 27, while method 211 is performed in the context of BMS-1 36-1.

Referring to FIG. 8*a*, method 201 starts at step 202, in which the compliance of the initialization session request against session policies at a shared area level, is determined. If such compliance is not determined, then the session is denied.

Step 202 is followed by step 203 of detecting whether the requested content is available. If the answer is yes, step 203 is followed by step 204, else step 203 is followed by step 205. With reference to FIG. 6*b*, if member 43-1-*r*-*q* requests to receive a digital television channel that is included within MUX_SIGNAL 40-1-$r$ then the requested content is available.

In step 205 shared area manager 154-1-$r$ checks if the requested content is included within MUX-SIGNAL 38-1. If the answer is yes, step 205 is followed by step 204, else the session is denied. In step 207 of FIG. 8$b$ shared area manager 154-1 checks if the requested content of included within any of MUX_SIGNAL 38-$s$. If the answer is yes, step 207 is followed by step 204', else the session is denied.

In step 204, the session bandwidth request, respective of the initialization session request, is compared with the current available bandwidth within a selected channel. It is noted that a conventional session can run over one or more channels, where each channel has to be able to provide a predetermined bandwidth. Accordingly, If the session bandwidth request is greater than the current available bandwidth with respect to selected channels, then session request proceed to step 206, else session request proceed to step 208. According to an aspect of the invention a high priority service, such as a digital television channel, can replace lower priority service and/or service that is provided to members of a service group but is of no current interest. The replacement of a service by another may reflect both predefined priority criteria and real time status reflecting the behavior patters of members of a service group.

In step 206, a free channel is assigned to the current shared area where one is available. This assignment is performed by the DNR manager as will be described herein below. If such assignment fails, then the session request is denied. A free channel can also be a channel that is occupied by a service that is scheduled to be replaced by a higher priority service.

In step 208, an optimal channel is assigned to the session, based on session content type & load balancing network policy. Optimization schemes for managing the load can be determined according to various considerations and can be set by the system operator.

In step 210, the selected channel manager is notified to prepare for a new session. The channel manager adds, by means of multiplexing, this new session to the sessions, which are currently present in that channel. It is noted that this notification can further include session parameters, which are directed at reducing the bandwidth of that session or other selected sessions in the channel.

In step 212, the channel readiness is determined. If the channel is not ready, then the session request is denied. Otherwise, the session request is approved.

Figure 9:
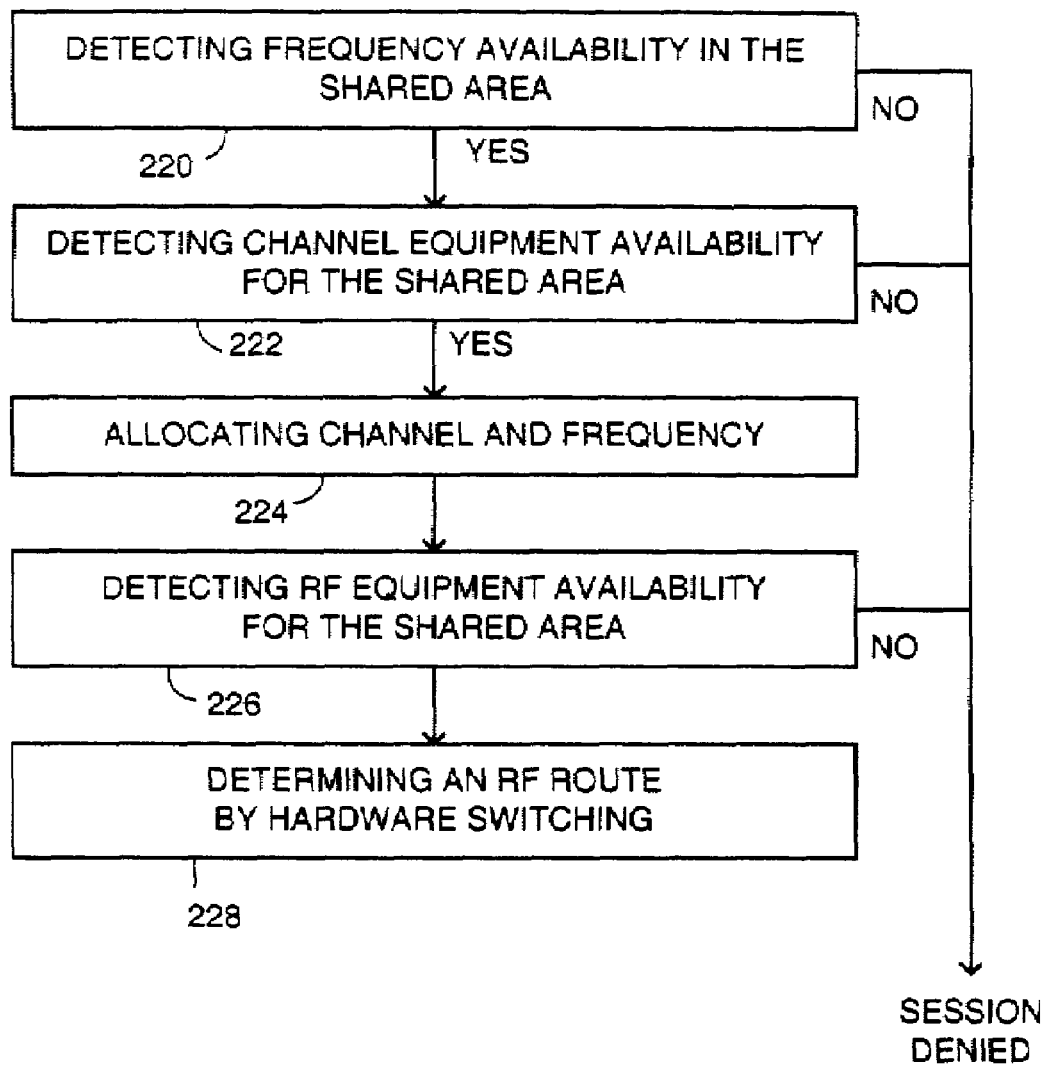
FIG. 9 is an illustration of a method for operating a dynamic network resources manager, operative in accordance with a further preferred embodiment of the present invention.

Reference is now made to FIG. 9, which is an illustration of a method for operating the DNR manager 106 of FIGS. 6$b$ and 4$b$, operative in accordance with another preferred embodiment of the present invention. In step 220, bandwidth availability in the shared area, is detected. The bandwidth availability is detected with respect to the frequency bandwidth which is regularly available, and with respect to the currently running application, applications which are scheduled to run during the anticipated time frame of the session request, and other considerations such as bandwidth, which has to be reserved, and the like. If frequency bandwidth is not available, according to the session request, then the session request is denied.

In step 222, availability of channel equipment at the shared area (hardware) is detected. Such channel equipment can include for example an available QAM unit. If such channel equipment is not available, then the session request is denied.

In step 224, channel and frequency are allocated. With reference to FIG. 1, dynamic network restructuring unit 106 operates a selected QAM unit, to modulate the soon to be running session, at a selected frequency bandwidth.

In step 226, RF equipment availability is located for the shared area. Such RF equipment is for example an available input port at a functioning RF combiner. If such RF equipment, which meets the requirements of the session request, is not available, then the session request is denied.

In step 228, an RF route is determined by hardware switching. With reference to FIG. 1, dynamic network restructuring unit 106 operates RF switch 120 to connect a selected QAM of QAM array 118, to a selected input port at a selected RF combiner of RF combiner array 122.

DNR manager 107 is operated in an analogue manner, that reflects the type of the transmitters within network interface unit 117. For example, as network interface unit can contain optical transmitters, DNR 107 can be configured to locate free wavelengths/local paths across the interface and manage the optical transmitters accordingly.

Reference is now made to FIGS. 10$a$–10$b$, which are detailed schematic illustrations of broadband multimedia router 116 of FIGS. 4$a$ and 4$b$, constructed and operative in accordance with a further preferred embodiment of the invention. Broadband multimedia router 116 is operative to direct a variety of packet types, even when a packet does not include destination address information. According to the present invention, broadband multimedia router 116 makes sure that each entering data packet, which does not include destination information, is assigned such information, according to the session directing commands provided by the session manager 102.

Broadband multimedia router 116 of FIG. 10$a$ is fed by satellite dish interfaces 22_1 and 24_1, internet access 260 and headend content providers 28. Satellite dish interfaces 22_1 and 24_1 and headend content providers can provide a plurality of media streams originating from a various media sources, such as VOD servers 252, music on demand unit 254, interactive MPEG unit 256, Internet television 258, telephony gateway 262, and the like. Broadband multimedia router 116 includes a plurality of DVB/ASI_IN modules $264_1$, $264_2$ and $264_N$, Gigabit Ethernet module 266, Fast Ethernet module 268, a plurality of DVB/ASI_OUT modules $270_1$, $270_2$ and $270_N$, a plurality of stream processors $278_1$, $278_2$ and $278_N$, and a core switch 274. It is noted that broadband multimedia router 116 further includes an internal controller and intermediate memory means (not shown), for operating and coordinating the various units thereof.

Switch 274 is connected to DVB/ASI_IN modules $264_1$, $264_2$ and $264_N$, Gigabit Ethernet module 266, Fast Ethernet module 268, additional network adapter 276 and CMTS Engine Module 272. Switch 274 is further connected to DVB/ASI_OUT modules $270_1$, $270_2$ and $270_N$, via respective stream processors $278_1$, $278_2$ and $278_N$. DVB/ASI_OUT modules $270_1$, $270_2$ and $270_N$ are further coupled to network interface unit 117, for providing downstream data to end-users via network 30 and BMS-s.

DVB/ASI_IN modules $264_1$, $264_2$ and $264_N$ are input ports, which receive MPEG transport packets. It is noted that an MPEG transport packet encapsulating elementary media, includes a stream ID, also called PID. Stream processors $278_1$, $278_2$ and $278_N$ are operative to perform stream processing procedures such as multiplexing, re-multiplexing, rate adaptation, PID re-mapping, PCR re-stamping, updating system information embedded in transport streams, and the like. it is noted that stream processors 278 can be considered an integral part of broadband multimedia router 116.

The following is an example for a complex routing situation, which is performed by broadband multimedia router 116. DVB/ASI_IN module $264_1$ receives three media streams $S_1$, $S_2$ and $S_3$, having PIDs of 50, 100 and 200, respectively. Media streams $S_1$, $S_2$ and $S_3$ are to be directed to DVB/ASI_OUT modules $270_2$, $270_2$ and $270_1$, respectively. Substantially, at the same time, DVB/ASI_IN module $264_2$ receives four media streams $S_4$, $S_5$, $S_6$, and $S_7$, having PIDs of 100, 120, 200 and 300, respectively. Media streams $S_4$, $S_5$, $S_6$, and $S_7$ are to be directed to DVB/ASI_OUT modules $270_2$, $270_7$ (not shown), $270_1$ and $270_{23}$ (not shown), respectively.

In the present example, core switch 274 is a generic packet switching device and hence every packet provided thereto, has to be in a known addressable packet format. With respect to the media streams received at DVB/ASI_IN module $264_1$, broadband multimedia router 116 encapsulates a packet of media stream $S_1$, in an addressable packet, with destination information respective of the switch port, connected to DVB/ASI_OUT module $270_2$ and its original stream PID 50. Switch 274 directs the produced addressable packet to DVB/ASI_OUT module $270_2$, which opens the encapsulation, reconstructs the media stream packet, and assigns the stream PID provided by broadband multimedia router 116. It is noted that broadband multimedia router 116 can provide a stream PID, which is different from the original stream PID of the packet, as will be described herein below.

Broadband multimedia router 116 encapsulates a packet of media stream $S_2$, in an addressable packet, with destination information respective of the switch port connected to DVB/ASI_OUT module $270_2$ and its original PID 100. Broadband multimedia router 116 encapsulates a packet of media stream $S_3$, in an addressable packet, with destination information respective of the switch port connected to DVB/ASI_OUT module $270_1$ and its original PID 200.

With respect to the media streams received at DVB/ASI_IN module $264_2$, broadband multimedia router 116 encapsulates a packet of media stream $S_4$, in an addressable packet, with destination information respective of the switch port connected to DVB/ASI_OUT module $270_2$ but assigns a new PID 150, since PID 100 is already used for DVB/ASI_OUT module $270_2$, by media stream $S_2$. Here, switch 274 directs the produced addressable packet to DVB/ASI_OUT module $270_2$, which opens the encapsulation, reconstructs the media stream packet, and assigns the stream PID (150) provided by broadband multimedia router 116, which is different than the original stream PID (100). Similarly, broadband multimedia router 116 encapsulates a packet of media stream $S_6$, in an addressable packet, with destination information respective of the switch port connected to DVB/ASI_OUT module $270_1$ but with a new PID 100, since PID 200 is already used for DVB/ASI_OUT module $270_1$ by media stream $S_3$. This procedure is called PID re-mapping.

Broadband multimedia router 116 encapsulates a packet of media streams $S_5$ and $S_7$, in addressable packets; with destination information respective of the switch port connected to DVB/ASI_OUT modules $270_7$ and $270_{23}$, with their respective original PIDs 120 and 300.

The above routing procedure is performed according to specific instruction provided by the session manager 102, for example, by means of a routing table. In case of an MPEG transport packet, broadband multimedia router 116 accesses the routing table according to the stream PID of that packet, and the DVB/ASI_IN module identification, which was received, and retrieves the predetermined destination associated therewith. It is noted that the predetermined destination is respective of the combination of the packet stream PID, and the respective DVB/ASI_IN module identification.

A data packet received from Gigabit Ethernet module 266, or from Fast Ethernet module 268, is typically an addressable packet and hence already contains destination information. This data packet can be directed to a respective output port of the switch, according to that destination information. It is noted that session manager 102 can instruct broadband multimedia router 116, for example, by means of a routing table, to direct addressable packets to predetermined ports, which are set to be different but according to the destination information embedded in the packet.

Broadband multimedia router 116 is further operative to perform various stream processing procedures such as multiplexing, re-multiplexing, rate adaptation, PID re-mapping, PCR re-stamping (e.g., jitter reduction procedure by updating the program clock reference fields), updating system information embedded in transport streams, and the like. Such stream processing procedures are usually carried in an outgoing route of broadband multimedia router 116 (e.g., either in switch 274, in one of the output modules 270, 266 and 268, or in the route there between, by specific modules). In the present example, each of the DVB/ASI_OUT modules 270 is also operative to encapsulate other types of data in MPEG transport format, perform statistical multiplexing, and stream rate adaptation, to adapt the bandwidth and quality of the media stream to the available network resources.

Input interface 273 is configured to receive upstream signals from network interface unit 117. If the upstream signals are data signals received over MPEG transport, input interface transforms it to IP format and provides it to the switch 274, for directing to an IP module such as Gigabit Ethernet module 266, or Fast Ethernet module 268.

Figure 10A:
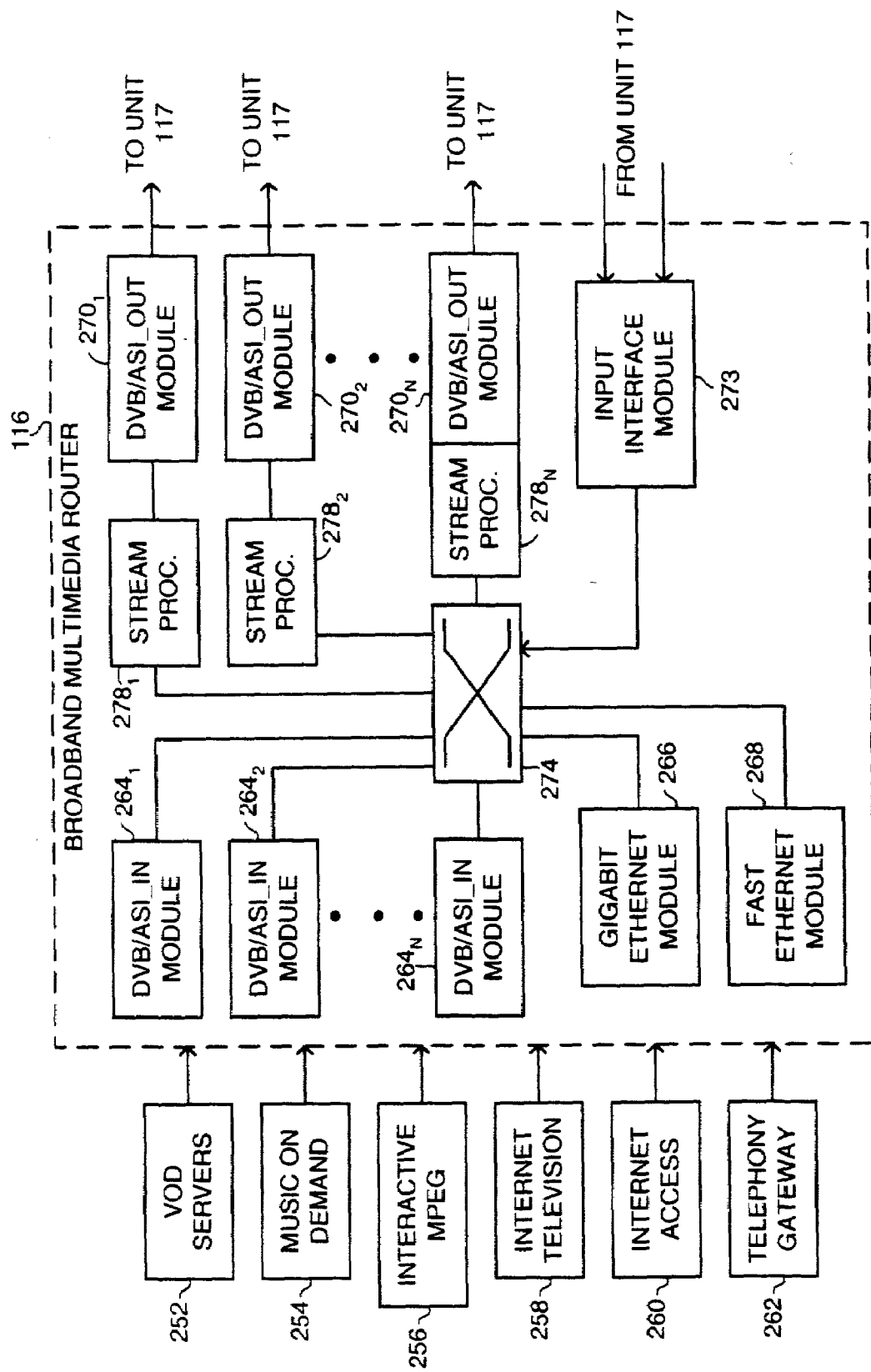
FIGS. 10a–10b are detailed schematic illustrations of the router of FIGS. 4a–4b, constructed and operative in accordance with another preferred embodiment of the present invention.
Figure 10B:
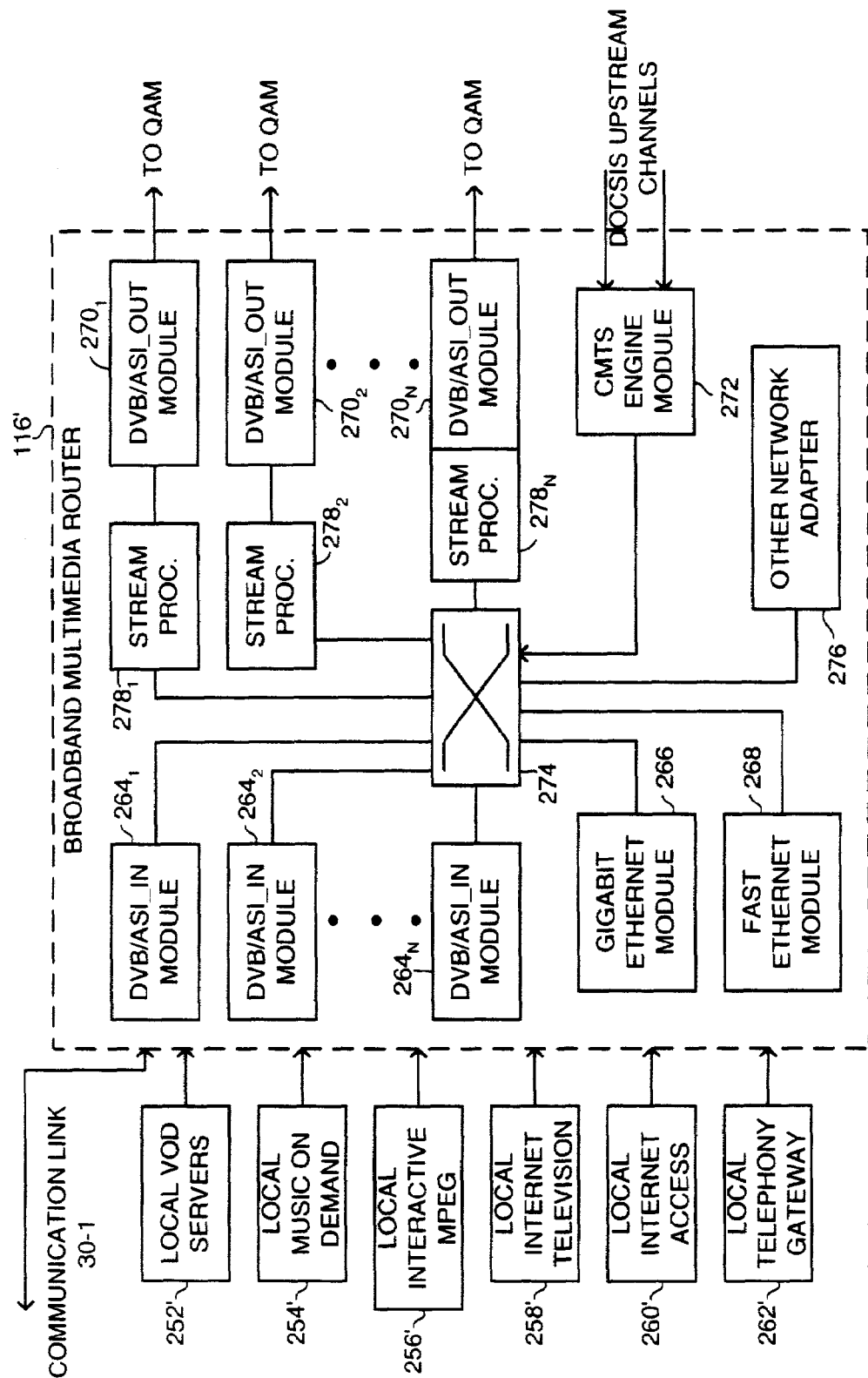

Broadband multimedia router 116' of FIG. 10b is analogues to broadband multimedia router 116 of FIG. 10a, but is has modules 272 and 276 instead of input module 273. Broadband multimedia module 116' is fed by communication link 30-1 and hub content provider 50-1. Communication link 30-1 is used to convey MUX_SIGNAL 38-1, while hub content provider 50-1 can provide a plurality of media streams originating from a various media sources, such as local VOD servers 252', local music on demand unit 254', local interactive MPEG unit 256', local Internet television 258', local telephony gateway 262', and the like.

CMTS Engine Module 272 receives data over MPEG transport from the end-user in the up stream direction, transforms it to IP format and provides it to the switch 274, for directing to an IP module such as Gigabit Ethernet module 266, or Fast Ethernet module 268. CMTS Engine Module 272 further transmits DOCSIS downstream information to the end-user via DVB/ASI_OUT modules 270.

Additional network adapter 276 is operative to connect to various network types such as ATM, SONET, and the like.

Figure 11:
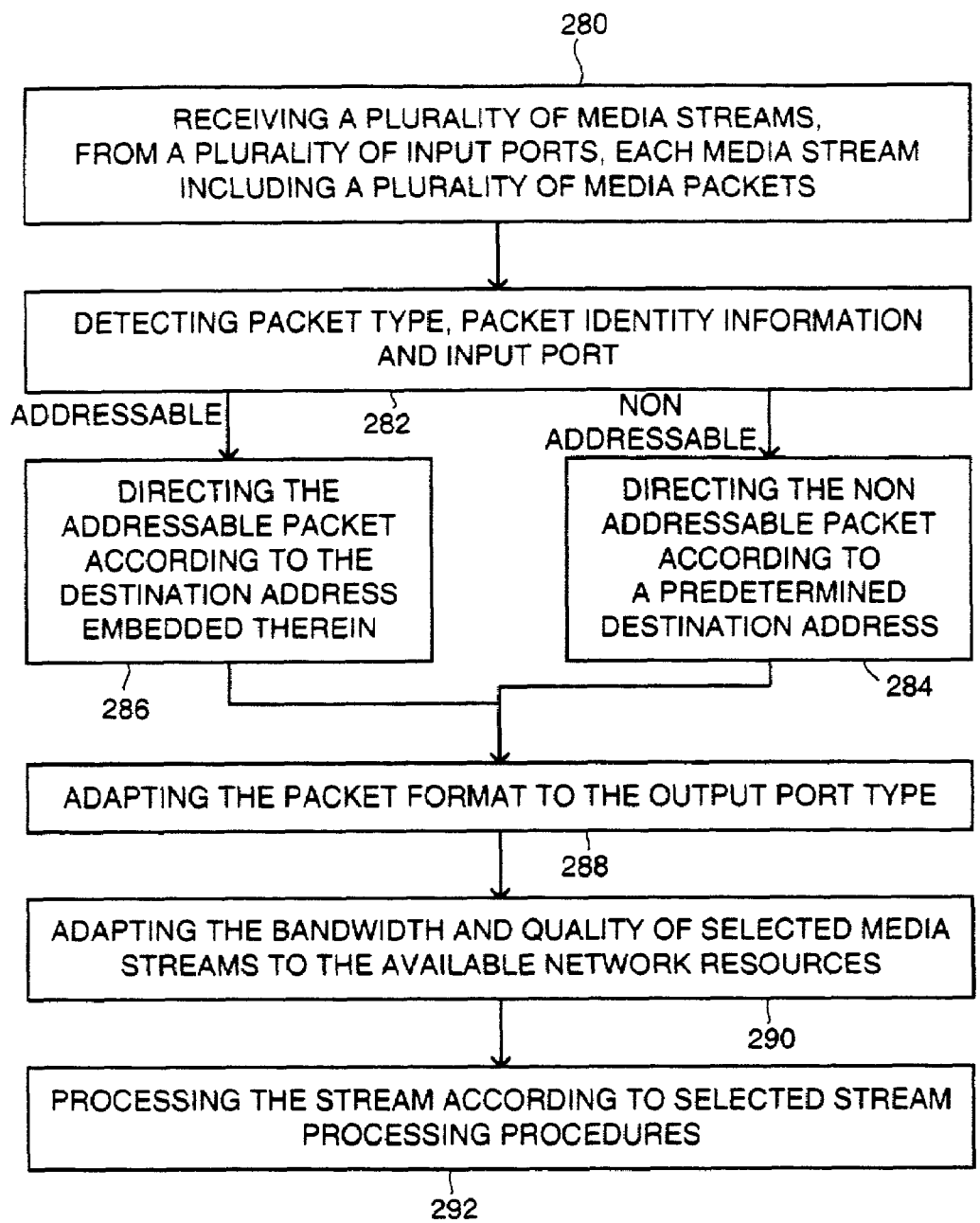
FIG. 11 is an illustration of a method for operating the routers of FIGS. 10a–10b, operative in accordance with a further preferred embodiment of the present invention.

Reference is now made to FIG. 11, which is an illustration of a method for operating broadband multimedia router 116 of FIG. 10a, and multimedia router 116' of FIG. 10b, operative in accordance with another preferred embodiment of the present invention. In step 280 a plurality of media streams are received from a plurality of input ports, where each media stream includes a plurality of media packets. These media streams can include video streams, audio streams, data streams and the like. With reference to FIG. 6, DVB/ASI_IN modules $264_1$, $264_2$ and $264_N$, Gigabit Ethernet Module 266, and Fast Ethernet module 268 receive a plurality of media streams from VOD Servers 252, music on demand 254, interactive MPEG 256, Internet television 258, Internet access 260, telephony gateway 262, and the like.

In step 282 the type of a selected packet, its identity and the input port in which it was received, are detected. These media streams are generally divided in two types, which are addressable media streams and non-addressable media streams. An addressable media stream includes specific destination information, which is typically embedded in each of its packets; such as in IP packet, Ethernet packet, and the like. Such destination information is used to direct each packet to the final destination, and do so at different routes for each packet. A non-addressable media stream does not include specific destination information, such as MPEG transport elementary stream, which only includes a packet identification code, indicating that the stream packets belong to the same stream. With reference to FIGS. 10a–10b, broadband multimedia router 116 (116') determines the packet type, according to the type of input port it was received in. A packet received in a DVB/ASI_IN module 264 is a non-addressable multimedia stream oriented packet (e.g. video, audio or data over multi-media transport standards such as IP over MPEG transport). A packet received in Gigabit Ethernet module 266 or from Fast Ethernet module 268 is an addressable media stream oriented packet, such as an IP packet. The identity and input port information is stored and used in the routing process of each packet. If the packet is non-addressable media stream oriented, then the method proceeds to step 284. Otherwise, if the packet is addressable media stream oriented, then the method proceeds to step 286.

In step 284, a non-addressable packet is directed according to a predetermined destination address. Hence, a non-addressable media stream packet is temporarily converted into an addressable media stream packet, which hence, can be directed. The destination address is provided by the session manager 102, and is retrieved momentarily according to the packet stream identification, and according to the identification of the input port, which received it. It is noted that a packet can have more than one destination address. This is known as multicast.

In step 286, an addressable packet is directed according to a destination address embedded therein. It is noted that this address can further be translated to another predetermined destination address provided by the session manager 102.

In step 288, the packet format is adapted to conform to the type of the output port. If the routing was performed on data oriented packets; such as IP packets; and the output port type is DVB/ASI, then the packet is converted as follows: a stream oriented packet which was encapsulated in an IP packet format, is reconstructed. A data oriented packet is converted to (encapsulated in) MPEG transport format packets.

In steps 290 and 292, the bandwidth and quality of selected media streams are adapted to meet the available network resources and the stream is processed according to selected stream processing procedures, such as multiplexing, re-multiplexing, rate adaptation, PID re-mapping, PCR re-stamping, updating system information embedded in transport streams, and the like. With reference to FIGS. 10a–10b, these operations are performed by DVB/ASI_OUT modules 270 and stream processors 278.

This technique of enabling non addressable media stream switching (such as MPEG) provides several advantages such the enhanced sharing of bandwidth among several sessions, the mere mixing of addressable media streams with non addressable media streams, enhanced hardware and bandwidth utilization and more.

Figure 12:
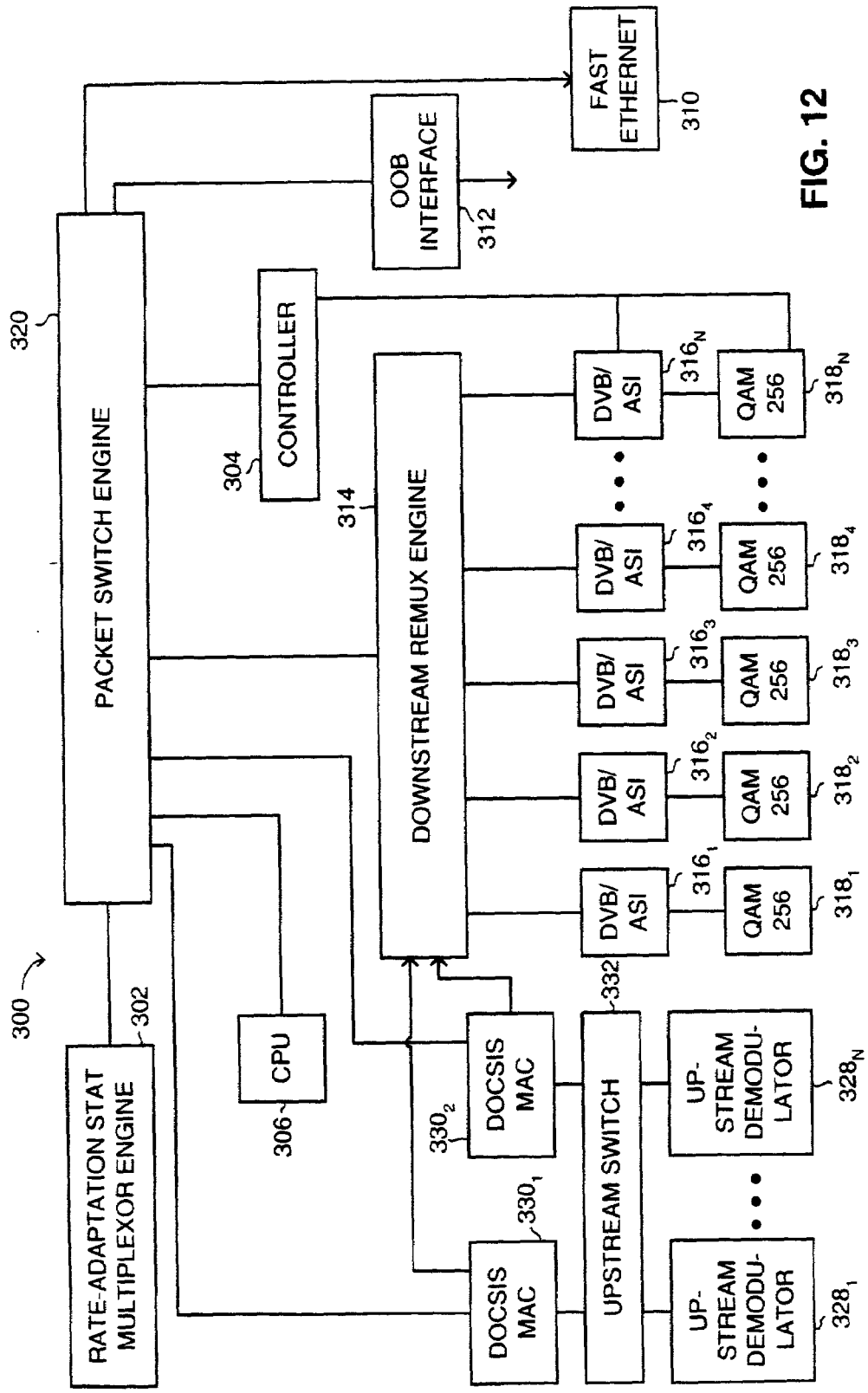
FIG. 12 is a schematic illustration of a packet switch system, constructed and operative in accordance with another preferred embodiment of the present invention.

Reference is now made to FIG. 12, which is a schematic illustration of a packet switch system, generally referenced 300, constructed and operative in accordance with a further preferred embodiment of the invention. System 300 can be functionally located within a hub, for switching and converting various types of data packets.

System 300 includes a packet switch engine 320, a rate-adaptation statistical-multiplexer engine 302, a controller 304, a CPU 306, Fast Ethernet interface 310 and an out-of-band interface 312 to the out-of-band manager (not shown), a downstream re-multiplexer engine 314, and a plurality of DVB/ASI modules $316_1$, $316_2$, $316_3$, $316_4$ and $316_N$. System 300 further includes a plurality of QAM units $318_1$, $318_2$, $318_3$, $318_4$ and $318_N$, two DOCSIS MAC units $330_1$ and $330_2$, an upstream switch 332, and a plurality of upstream demodulators $328_1$ and $328_N$.

Packet switch engine 320 is connected to rate-adaptation statistical-multiplexer engine 302, controller 304, downstream re-multiplexer engine 314, Fast Ethernet interface 310, out-of-band interface 312, CPU 306 and DOCSIS MAC units $330_1$ and $330_2$. Downstream re-multiplexer engine 314 is further connected to DVB/ASI modules $316_1$, $316_2$, $316_3$, $316_4$ and $316_N$. Each DVB/ASI module 316 is further connected to a respective QAM unit $318_1$, $318_2$, $318_3$, $318_4$ and $318_N$. Upstream switch 332 is connected between upstream demodulators $328_1$ and $328_N$, and DOCSIS MAC units $330_1$ and $330_2$. Each output channel directed through a selected DVB/ASI module, is operative to transmit a plurality of video sessions, as well as a plurality of DOCSIS sessions, at the same time.

Each of the upstream demodulators $328_1$ and $328_N$ performs down-conversion, and demodulation to upstream channels received from an end-user. The upstream switch 332 receives a plurality of upstream channels from upstream demodulators $328_1$ and $328_N$, each carrying DOCSIS return path information. The upstream switch 332 is operative to direct each of the received upstream channels, to each of the DOCSIS MAC units $330_1$ and $330_2$, thereby providing improved bandwidth efficiency, and better redundancy and reliability for the upstream functionality. This architecture allows the upstream resources to be dynamically allocated to each of DOCSIS MAC units $330_1$ and $330_2$. When noise or other errors appear on a specific upstream channel, switch 332 can dynamically change the upstream channel allocation.

DOCSIS MAC units $330_1$ and $330_2$ provide packets received from upstream switch 332, either to downstream re-multiplexing engine 314 or to packet switch engine 320, depending on the packet content type and original destination. Downstream re-multiplexer engine 314 performs data encapsulation, statistical multiplexing and video rate adaptation and multiplexing.

System 300 can further perform load balancing of outgoing transmission of various types, at the same time and through the same outgoing channels, such as a plurality of video streams and a plurality of DOCSIS sessions, transmitted over the same DVB/ASI modules 316. CPU 306 determines and controls the load balancing between such competing elements and provides parameters there according, to downstream re-multiplexing engine 314, rate adaptation statistical multiplexer engine 302 and DOCSIS MAC units $330_1$ and $330_2$.

For example, a video stream and a DOCSIS session, which are transmitted over one of the DVB/ASI modules 316 initially separated to various quality levels (described herein below in conjunction with FIGS. 10A–10K), where the first quality level denotes a minimal quality which has to be provided at all times. Higher quality levels can be provided when sufficient bandwidth is available therefore. It is therefore noted that the first quality level has the highest transmit priority.

DOCSIS sessions can be categorized according to quality of service associated therewith or assigned thereto. For example, an Email session would normally be characterized by a low level of quality of service and telephony sessions would normally be characterized by a high level of quality of service. CPU 306 constantly detects the load status of the system 300 and dynamically assigns transmit priority to the DOCSIS sessions processed by DOCSIS MAC units $330_1$ and $330_2$. Hence, when system 300 is significantly loaded by video sessions, some non real time sessions such as DOCSIS Email sessions can be delayed or assigned narrower bandwidth, while real time sessions, such as telephony sessions are forced into the transmit route, even at the expense of further degrading the quality of currently transmitting video sessions towards their first quality level.

Packet switch engine 320 receives different types of information via different input modules, such as Fast Ethernet interface 310 (coupled to the Internet or to similar networks), or out-of-band interface 312. Packet switch engine 320 analyzes the nature of the received streams simultaneously, and directs them according to a decision scheme illustrated herein below in conjunction with FIG. 13. Controller 304 controls the operation of the packet switch engine 320.

The rate-adaptation statistical-multiplexer engine 302, performs statistical multiplexing as well as rate adaptation when required, to elementary streams, before they are directed by the switch 320. CPU 306 is the central processing unit of the system, and can be supported in a cluster by other CPUs for increased system redundancy.

Figure 13:
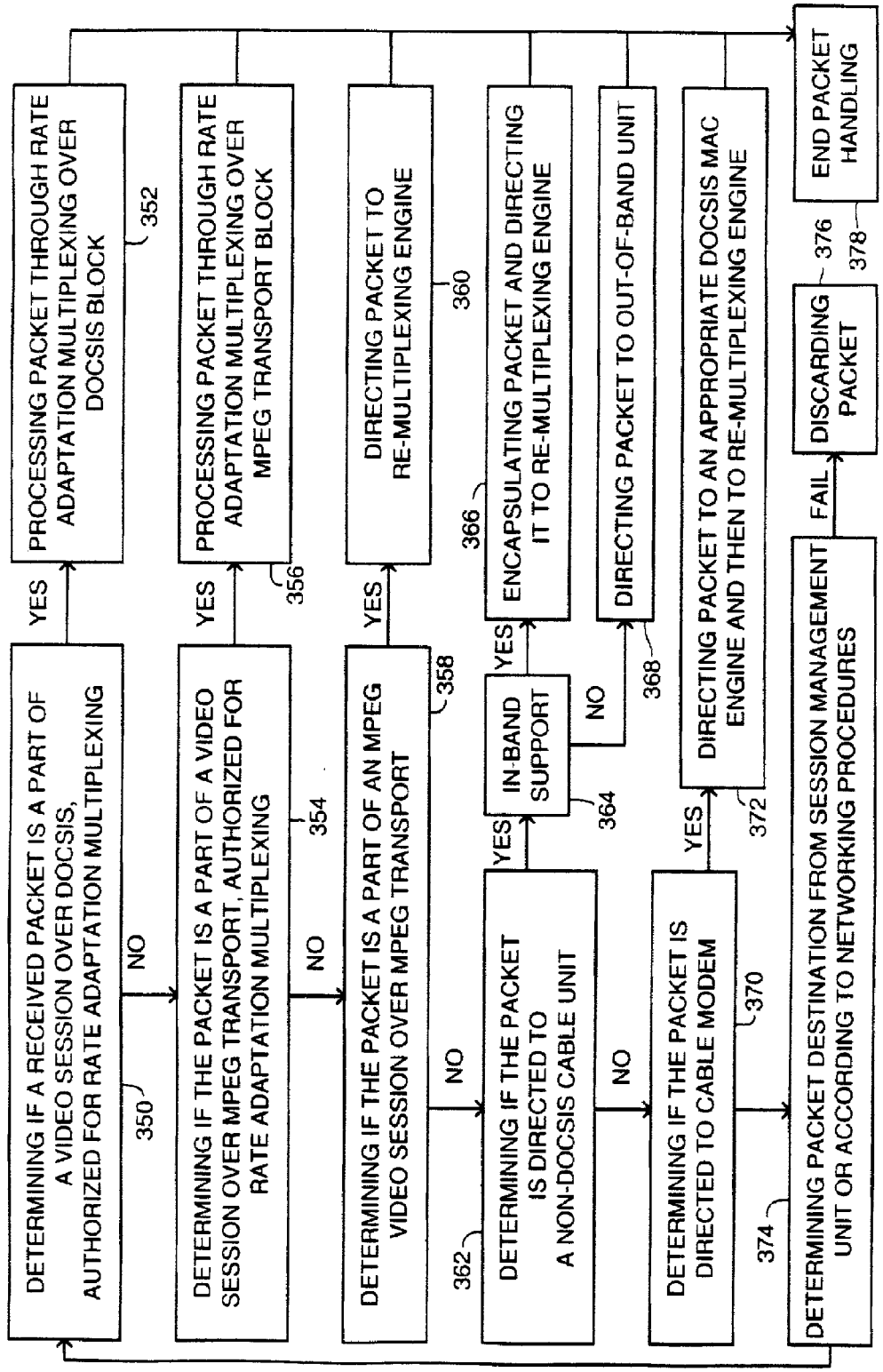
FIG. 13 is a schematic illustration of a method for operating the system of FIG. 12, operative in accordance with a further preferred embodiment of the present invention.

Reference is now made to FIG. 13, which is a schematic illustration of a method for operating system 300 of FIG. 12, operative in accordance with another preferred embodiment of the present invention.

In step 350, a received packet is analyzed to determine if it is a part of a video session over IP over DOCSIS, authorized for rate adaptation multiplexing. If so, then the packet is rate adapted (when required) and multiplexed over a DOCSIS block (step 352). With reference to FIG. 8, the packet is directed to module 302, where such operations are performed, and then further directed to DOCSIS MAC units 330 for further direction to the downstream re-multiplexing engine 314. Otherwise, the method proceeds from step 354.

In step 354, the received packet is further analyzed to determine if it is a part of a video session over MPEG transport, authorized for rate adaptation multiplexing. If so, then the packet is rate adapted (when required) and multiplexed over an MPEG transport block (step 356). With reference to FIG. 8, the packet is directed to module 302, where such operations are performed and further directed to downstream re-multiplexing engine 314. Otherwise, the method proceeds from step 358.

In step 358, the received packet is further analyzed to determine if it is a part of an MPEG video session over MPEG transport. If so, then the packet is directed to the cable system (step 360). With reference to FIG. 8, the packet is directed to downstream re-multiplexing engine 314. Otherwise, the method proceeds from step 362.

In step 362, the received packet is further analyzed to determine if its destination is a non-DOCSIS cable unit (for example an IP packet). If so, and the destination non-DOCSIS cable unit includes In-Band support for IP data (step 364), then the packet is encapsulated and re-multiplexed (step 366), before it is sent to that destination non-DOCSIS cable unit. But if the destination non-DOCSIS cable unit does not include In-Band support (step 364), then the packet is directed to the Out-Of-Band unit (step 368).

With reference to FIG. 8, since the packet is not a video packet, it is either encapsulated in MPEG transport and sent to the cable network via re-multiplexing engine 314, (step 366) when the receiving non-DOCSIS cable unit includes In-Band support, or sent through the Out-Of-Band via out-of-band interface 312 (step 368).

In step 370, the received packet is further analyzed to determine if its destination is a cable modem. If so then the packet is directed to the cable network via DOCSIS MAC with re-multiplexing. With reference to FIG. 8, the packet is directed to appropriate DOCSIS MAC engine 330, and then directed to the cable network via re-multiplexing engine 314.

In step 374, a final attempt is performed to classify the packet and determine its destination. If this attempt fails then the packet is discarded (step 376). With reference to FIG. 8, after the packet could not be classified, as described above, the session manager 102 is accessed to attempt to determine the packet destination. Further query procedures via conventional networking can also be performed at this time, for the same purpose. If the attempt to determine the destination of the packet fails, then the packet is discarded (step 376). Otherwise, the packet is directed to its destination and the method repeats from step 350 for the next packet.

It is noted that at the end of steps 352, 356, 360, 366, 368 and 370, the packet is substantially transmitted out of the routing system, and hence need not be handled anymore, thereby (step 378).

Figure 14:
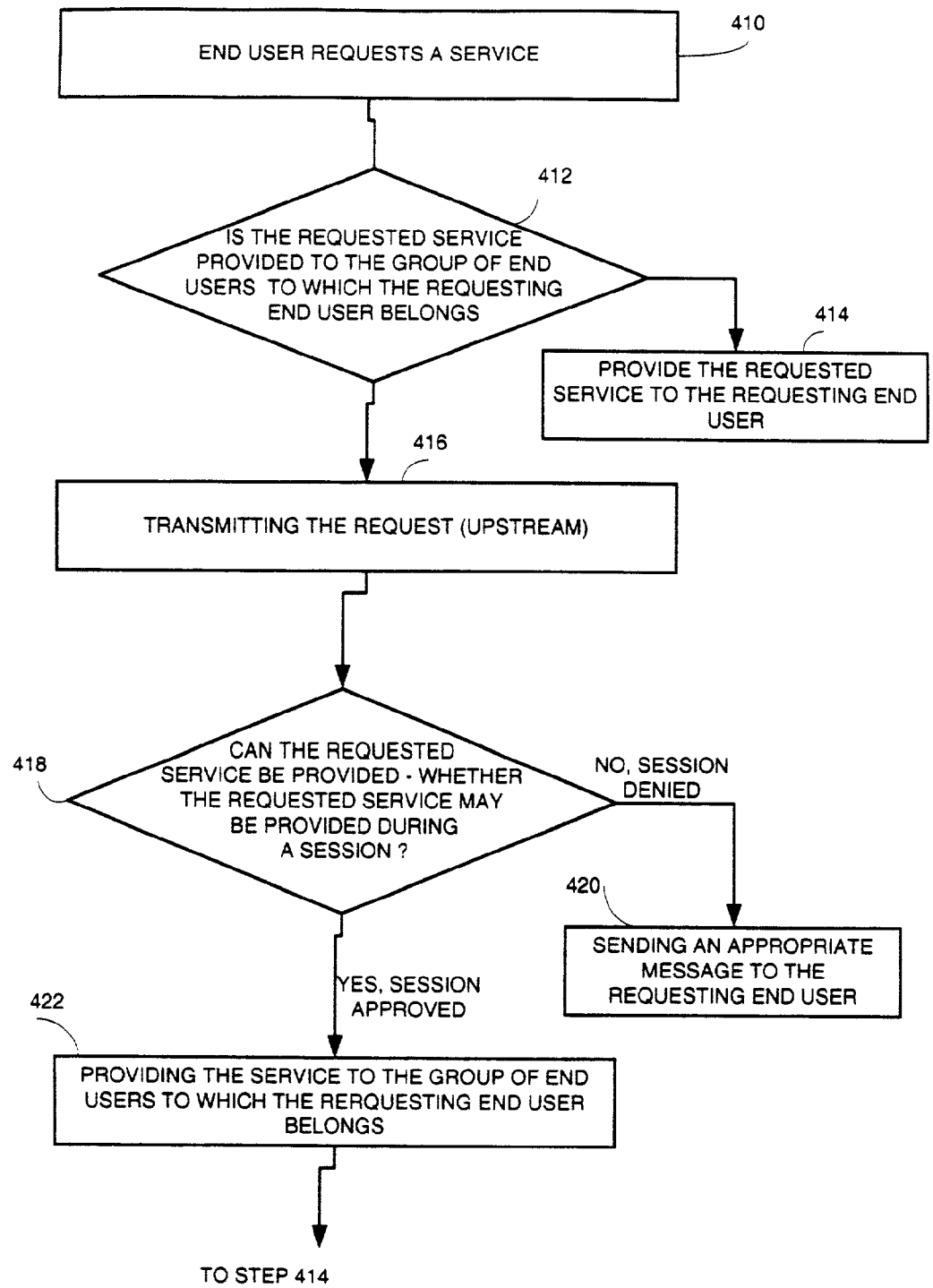
FIGS. 14–15 are schematic representations of methods for providing services to end-users, operative in accordance with further preferred embodiments of the present invention.
Figure 15:
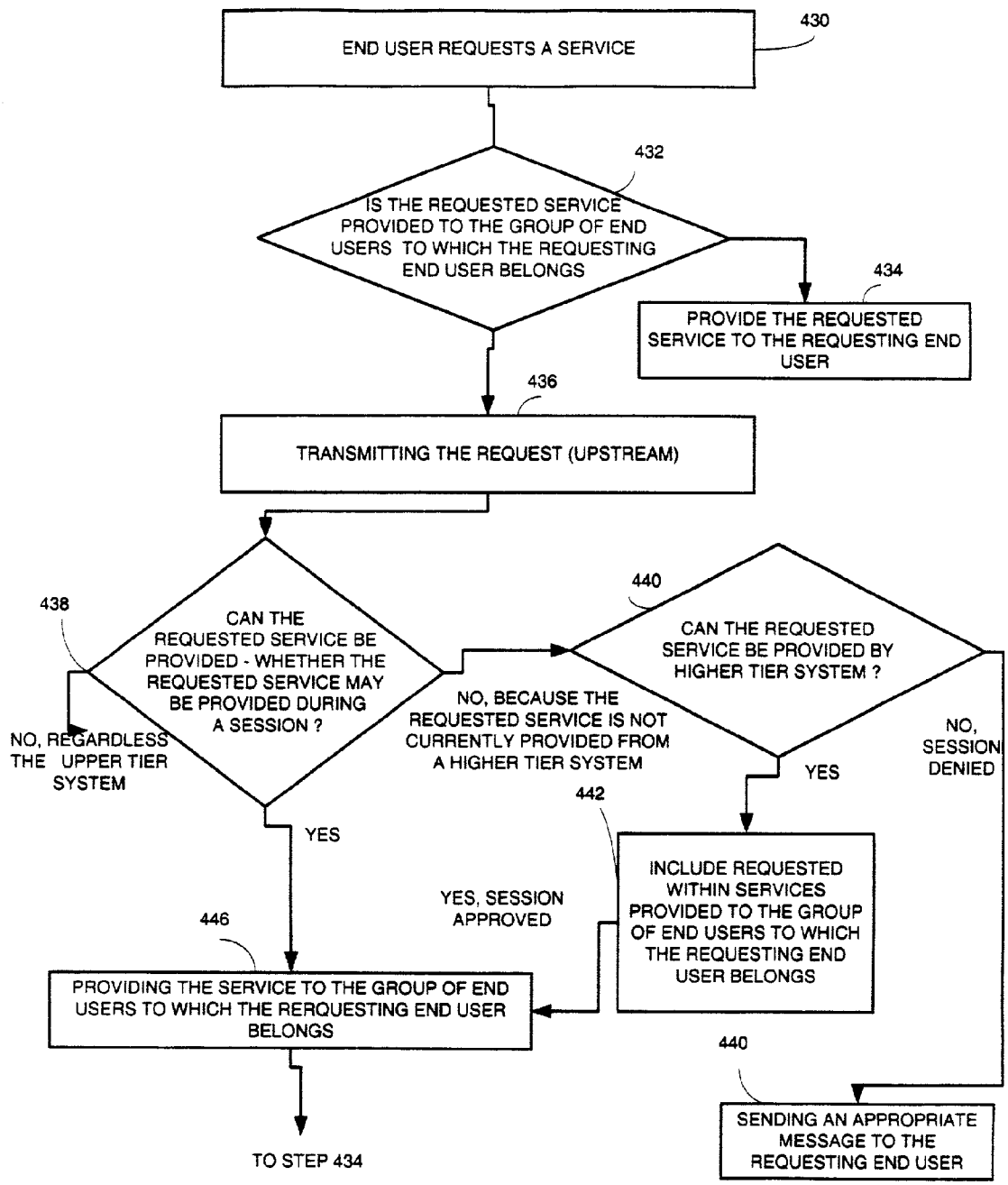

Referring to FIGS. 14–15, illustrative of methods 409 and 429 for providing services to end-users, operative in accordance with further preferred embodiments of the present invention.

Method 409 starts at step 410 when an end-user, requests to receive a service. Referring to the example set forth at FIG. 3b, it is assumed that the viewer of ST-1-1-1 requests to view a digital television channel denoted DTVC23. The request may be generated after DTVC23, a low quality representation of DTVC23, an indication allowing to select DTVC23, and the like are displayed to the viewer. The display may be of various forms, such as (a) an electronic program guide display, (b) a surfing channel, that cycles quickly through channels that are included within MUX_SIGNAL 40-1-1, (c) a surfing mosaic the gives the viewer instant access to several channels included within MUX_SIGNAL 40-1-1, (d) a menu of channels included within MUX-SIGNAL 40-1-1, and the like.

Step 410 is followed by step 412 of checking whether the service is already provided to one of the members of the service group of the requesting user. Referring to the example, checking if DTVC23 is included within MUX_SIGNAL 40-1-1.

If the result of step 412 is positive then step 412 is followed by step 414 of providing the service to the end-user. Referring to the example, DTVC23 is displayed to the viewer of ST-1-1-1. Else, step 412 is followed by step 416 of transmitting the request to receive the service in the upstream direction. Referring to the mentioned above example, the request is sent to BMS-1 36-1, either out-of band or in-band.

Step 416 is followed by step 418 of determining whether the request may be approved—whether the service can be provided to the end-user during a session. Conveniently, step 418 conveniently is analogues to steps 202–212 of FIG. 8b.

Referring to the example, BMS-1 36-1 determines whether DTVC23 can be included within MUX-SIGNAL 40-1-1 provided to ST-1-1-1 and the other members of service group 35-1. Step 418 includes checking whether DVTC23 may be provided to service group 35-1 during a session of BMS-1 36-1.

If the service can be provided to the end-user, step 418 is followed by steps 422 and 414 of providing the service to the service group of the end-user and displaying the service to the end-user, during at least one session. Referring to the example, DTVC23 is included within MUX_SIGNAL 40-1-1 and provided to end-user ST-1-1-1 during at least one session of BMS-1 36-1.

If the service cannot be provided to the end-user, the request is denied and optionally an appropriate message is sent to the end-user during step 420. Referring to the example, if DTVC23 cannot be included within MUX_SIGNAL 40-1-1 then the request is denied, and a "channel not available" message is transmitted to and displayed by ST-1-1-1.

Conveniently, each channel request, and each approval/denial of the request/session are registered in at least one data base reflecting the status of end-users, service groups, set of service groups and the like.

Method 429 includes: (A) steps 430, 432, 434, 436, 440, 446 that are analogues to steps 410, 412, 414, 416, 420 and 422 of method 409 respectively, (B) additional steps 436 and 442, and (C) step 438 that is partially analogues to step 418 of method 409.

The additional steps 436 and 440 and the change in step 438 are required as method 429 is executed by systems that may receive services from a high tier system.

At step 418 of FIG. 14, if a service cannot be provided the request was denied, while at step 438 of FIG. 15 a further check is made to determine whether the service may be provided by a high tier system and then to the end-user. The left arrow extending from box 438 reflects a session denial that cannot be rectified by a high tier system, while the right arrow extending from box 438 to 440 reflects a session that be approved but the requested service/session content is not available to the lower tier system. Referring to the example mentioned above, if DTVC23 is not included within MUX_SIGNAL 40-1-1 and the session cannot be approved from various reasons such as violating policy rules and the like, the session is denied. If the session can be approved but DTVC23 is not included within MUX_SIGNAL 38-1 then step 438 is followed by step 440.

Conveniently, step 440 is analogues to steps 202'–212' of FIG. 8b. During step 440 a high tier system checks whether the service can be provided to the lower tier system during at least one session of the high tier entity. Referring to the example illustrated in FIG. 3a, BMS-H 27 determines whether DTVC23 can be included within MUX_SIGNAL 38-1, and if so it is included during step 442. Step 442 is followed by steps 446 and 343 of including DTVC23 within MUX_SIGNAL 40-1-1 and displaying DTVC23 to the viewer of ST-1-1-1.

Control of the quality of video streams can be performed in many ways. Listed herein below is a novel method provided with respect to MPEG ISO/IEC 11172 and ISO/IEC 13818 video compression standards. A picture, which is to be encoded includes either a complete frame, or a field, which is the even or odd lines of a complete frame. The above standards define three types of encoded pictures, an I-picture, a B-picture and a P-picture. An I-picture (Intra-picture) includes the entire information, which is required to reconstruct the encoded picture. A P-picture (Predictive) includes information, which, in combination with previously encoded P-pictures and I-pictures, can reconstruct the encoded picture. A B-picture (Bi-directional) includes information, which, in combination with previous and future I-pictures and P-pictures, can reconstruct the encoded picture.

A picture to be encoded is divided into components at different levels. A slice includes a predetermined number of lines. A block includes a matrix of 8×8 pixels. A macro-block includes a 2×2 matrix of luminance blocks (which results in a 16×16 matrix of pixels).

Each block of pixels is transformed using Discrete Cosine Transform (DCT) that produces a respective sequence of values. These values are then divided by a quantizing parameter, also called the quantizing scale and only the integer portion of the results, is kept. For example, if the DCT results in the following sequence 16, 5, 10, 2, 0, 4 and the quantizing scale is 6, then the resulting sequence is 2, 0, 1, 0, 0, 0. It is noted that a different quantizing value can be used for every macro-block.

After the DCT and quantizing stages, the set of values, preferably includes a large number of zero values. The values are further encoded using a method called Run Level Encoding (RLE), which transforms the sequence into pairs of number, a value (greater than zero) and the number of zero values that preceded it.

The present invention provides a method in which a quantized sequence is further quantized to a plurality of higher quantization levels (higher compression, lower quality). The highest quantization level is set to be the base level. The output data includes the base level and the difference between each two adjacent levels, up to the original one.

The following description addresses a stream component, which is a single frame. It is noted, for the purpose of the present invention, that frame can be replaced by any other stream component such as a slice, a macro-block, a block, a field and the like.

Reference is now made to FIG. 16A, which is a visual representation of block DCT values, at a predetermined quantizing value, after basic quantizing. As seen in FIG. 16A, most of the values are greater than zero. Reference is now made to FIGS. 16B, 16C, 16D, 16E and 16F, which are visual representations of the block of FIG. 16A, at different quantizing values, in accordance with a preferred embodiment of the present invention. FIGS. 16B, 16C, 16D, 16E and 16F represent the block values at respective quantizing values of Q=5, 4, 3, 2 and 16A (e.g., FIG. 16B represents the integer portions of the results of a division of the values of FIG. 16F, by 5.

Reference is now made to FIGS. 16G, 16H, 16I, 16J and 16K, which are representation of a layer structure, in accordance with another preferred embodiment of the present invention. FIG. 16G is a visual representation of the block of FIG. 16A, at the highest quantizing value and is identical to FIG. 16B. FIG. 16H represents the difference (A) between the representations of FIGS. 16B and 16C, so that adding the representation of FIG. 16C over the one of FIG. 16G, yields in the representation of FIG. 16C. similarly, FIG. 16I represents the difference (A) between the representations of FIGS. 16C and 16D, FIG. 16J represents the difference (A) between the representations of FIGS. 16D and 16E and FIG. 16K represents the difference (Δ) between the representations of FIGS. 16E and 16F.

The newly compressed frames at each of the compression levels (FIGS. 16B, 16C, 16D, 16E and 16F) can now be used to reproduce a representation of the media stream (deteriorated according to the compression level) or be sent to a far end of a communication network. Alternatively, the base layer (FIG. 16G) and as many successive supplemental layers (FIGS. 16H, 16I, 16J and 16K), can now be used to reproduce the media stream at various quality levels or be sent to a far end of a communication network. It is noted that a further packetizing stage can be used for re-multiplexing of a plurality of media streams.

It will be appreciated by persons skilled in the art that the present invention is not limited to what has been particularly shown and described hereinabove. Rather the scope of the present invention is defined only by the claims, which follow.

What is claimed is:

1. A system for dynamic provision of service conveying packets to groups of end-users, wherein each group of end-users is coupled to the system via a bandwidth limited medium, the system comprising:
    a router, operative to receive service conveying packets and to provide to each group of end-users group associated service conveying packets;
    a session manager, coupled to the router, said session manager providing routing instructions to said router, for dynamically selecting group of associated service conveying packets out of the received service conveying packets; wherein at least some of the service conveying packets comprising media signals; wherein the aggregate bandwidth of the received service conveying packets exceeds the bandwidth of the bandwidth limited medium.

2. A system for dynamic provision of service conveying packets to groups of end-users, wherein each group of end-users is coupled to the system via a bandwidth limited medium, the system comprising:
    a router, operative to receive service conveying packets and to provide to each group of end-users group associated service conveying packets;
    a session manager, coupled to the router, said session manager providing routing instructions to said router, for dynamically selecting group of associated service conveying packets out of the received service conveying packets; wherein at least some of the service conveying packets comprising media signals, wherein the system further comprises at least one media degradation unit, for compressing service conveying packets comprising of media signals.

3. A system for dynamic provision of service conveying packets to groups of end-users, each group of end-users is coupled to the system via a bandwidth limited medium, the system comprising:
    a router, operative to receive service conveying packets and to provide to each group of end-users group associated service conveying packets;
    a session manager, coupled to the router, said session manager providing routing instructions to said router, for dynamically selecting group of associated service conveying packets out of the received service conveying packets; wherein at least some of the service conveying packets comprising media signals; wherein the service is selected from a group consisting of:
    digital television channel;
    analog television channel;
    video on demand;
    internet television;
    audio on demand;
    radio channel;
    telephony;
    data; and
    internet.

4. A system for dynamic provision of service conveying packets to groups of end-users, wherein each group of end-users is coupled to the system via a bandwidth limited medium, the system comprising:
    a router, operative to receive service conveying packets and to provide to each group of end-users group associated service conveying packets;
    a session manager, coupled to the router, said session manager providing routing instructions to said router, for dynamically selecting group of associated service conveying packets out of the received service conveying packets; wherein at least some of the service conveying packets comprising media signals; wherein the selection of service conveying packets is responsive to a selection parameter selected from the group consisting of:
    predefined selection parameter;
    selection parameter reflecting the type of a service;
    selection parameter reflecting a status of at least one end-user;
    selection parameter reflecting a previous status of at least one end-user;
    predefined priority parameter;
    selection parameter reflecting requests to receive a service;
    selection parameters reflecting a current provision of a service to end-users;
    selection parameters reflecting previous provisions of a requested service;
    selection parameters reflecting a relationship between at least two services; and
    selection parameters reflecting at least one end-user behavior pattern.

5. A system for dynamic provision of service conveying packets to groups of end-users, wherein each group of end-users is coupled to the system via a bandwidth limited medium, the system comprising:
    a router, operative to receive service conveying packets and to provide to each group of end-users group associated service conveying packets;
    a session manager, coupled to the router, said session manager providing routing instructions to said router, for dynamically selecting group of associated service conveying packets out of the received service conveying packets; wherein at least some of the service conveying packets comprising media signals; wherein the selection is responsive to additional information selected from the group consisting of:
    bandwidth utilization information;
    bandwidth network management information;
    policy information;
    general policy rules;
    network policy rules;
    shared area session policy rules; and
    network reconstruction information.

6. A system for dynamic provision of service conveying packets to groups of end-users, wherein each group of end-users is coupled to the system via a bandwidth limited medium, the system comprising:
    a router, operative to receive service conveying packets and to provide to each group of end-users group associated service conveying packets; a session manager, coupled to the router, said session manager providing routing instructions to said router, for dynamically selecting group of associated service conveying packets out of the received service conveying packets: wherein at least some of the service conveying packets comprising media signals; wherein the service request is generated in response to a display of a service request interface selected from the group consisting of:
an electronic service guide;
a surfing channel that cycles through available channels;
a surfing mosaic displaying accessible services; and
a menu of accessible services.

7. A system for dynamic provision of service conveying packets to groups of end-users, wherein each group of end-users is coupled to the system via a bandwidth limited medium, the system comprising:
a router, operative to receive service conveying packets and to provide to each group of end-users group associated service conveying packets; a session manager, coupled to the router, said session manager providing routing instructions to said router, for dynamically selecting group of associated service conveying packets out of the received service conveying packets; wherein at least some of the service conveying packets comprising media signals; wherein the system further comprises network transmitters for transmitting to each group of end-users group associated service conveying packets over the bandwidth limited media for providing channel managing commands.

8. A system for dynamic provision of service conveying packets to groups of end-users, wherein each group of end-users is coupled to the system via a bandwidth limited medium, the system comprising:
a router, operative to receive service conveying packets and to provide to each group of end-users group associated service conveying packets; a session manager, coupled to the router, said session manager providing routing instructions to said router, for dynamically selecting group of associated service conveying packets out of the received service conveying packets; wherein at least some of the service conveying packets comprising media signals; wherein the system further comprises a plurality of shared area managers, each shared area manager being associated with a single group of end-users, each shared area manager is operative to select group associated service conveying packet to be provided to the associated group of end-users.

9. A system for dynamic provision of service conveying packets to groups of end-users, wherein each group of end-users is coupled to the system via a bandwidth limited medium, the system comprising:
a router, operative to receive service conveying packets and to provide to each group of end-users group associated service conveying packets; a session manager, coupled to the router, said session manager providing routing instructions to said router, for dynamically selecting group of associated service conveying packets out of the received service conveying packets; wherein at least some of the service conveying packets comprising media signals; wherein some of the service conveying packets are non-addressable packets; wherein some service conveying packets are addressable packets; wherein the router comprising:
a plurality of input ports, including at least one non-addressable stream input port;
a plurality of non-addressable stream output ports;
a multiple port switch, connected between said non-addressable stream input ports and said non-addressable stream output ports;
said multiple port switch directing a non-addressable service conveying packet, received from a selected one of said at least one non-addressable stream input ports, to at least a selected one of said at least one non-addressable stream output ports,
said multiple port switch selecting said selected non-addressable stream output port according to the type and identity of said selected non-addressable stream input port and the identity information embedded in said non-addressable service conveying packet.

10. The system according to claim 9, further comprising at least one addressable stream communication port, connected to said multiple port switch, said multiple port switch directing an addressable service conveying packet, received from a selected one of said at least one addressable stream communication ports, to at least a selected one of said at least one non-addressable stream output ports.

11. The system according to claim 9, wherein the selected non-addressable stream output port encapsulating an addressable service conveying packet in a non-addressable stream packet, when the addressable packet is received from one of said at least one addressable stream input ports.

12. The system according to claim 9, wherein MPEG transport packets are encapsulated into communication packets respective of the communication protocol of said multiple port switch.

13. The system according to claim 9, wherein said at least one non-addressable stream input port comprises a multiple program transport interface and wherein said at least one non-addressable stream output port comprises a multiple program transport interface.

14. The system according to claim 9, further comprising a plurality of stream processors, each said stream processor being connected between said multiple port switch and a respective one of said non-addressable stream output ports.

15. The system according to claim 9, wherein each said stream processors is operative to at least perform a procedure selected from the list consisting of: multiplexing; re-multiplexing; rate adaptation; PID re-mapping; PCR re-stamping; and updating system information embedded in transport streams.

16. A system for dynamic provision of service conveying packets to groups of end-users, wherein each group of end-users is coupled to the system via a bandwidth limited medium, the system comprising:
a router, operative to receive service conveying packets and to provide to each group of end-users group associated service conveying packets; a session manager, coupled to the router, said session manager providing routing instructions to said router, for dynamically selecting group of associated service conveying packets out of the received service conveying packets; wherein at least some of the service conveying packets comprising media signals; wherein the system is operative to receive set of group associated service conveying packets from a high-tier system, the high-tier system comprising: a router, operative to receive service conveying packets and to provide the set of group associated service conveying packets to the system for dynamic provision of service conveying packets; a session manager, coupled to the router, said session manager providing routing instructions to said router, for dynamically selecting set of group associated service conveying packets out of the received service conveying packets; wherein at least some of the service conveying packets comprising media signals.

17. The system according to claim 16 wherein the aggregate bandwidth of the received service conveying packets received by the top tier system exceeds the aggregate bandwidth of each set of group associated service conveying packet.

18. A method for dynamic provision of service conveying packets to groups of end-users, each group of end-users is coupled to the system via a bandwidth limited medium, at least some of the service conveying packets being media service conveying packets; the method comprising the steps of:
receiving service conveying packets; whereas the aggregate bandwidth of the received service conveying packets at each given time, exceeds the bandwidth of the limited bandwidth media; and
dynamically selecting group associated service conveying packets out of the received service conveying packets to be provided to the associated group of end-users.

19. The method according to claim 18 wherein the selection is responsive to requests from end-users to receive requested service conveying packets.

20. The method according to claim 19 wherein the service request is generated in response to a display of a service request interface selected from the group consisting of:
an electronic service guide;
a surfing channel that cycles through available channels;
a surfing mosaic displaying accessible services; and
a menu of accessible services.

21. The method according to claim 18 wherein the step of selecting comprising selectively compressing media service conveying packets such that the aggregate bandwidth of group associated service conveying packets does not exceed the bandwidth of the limited bandwidth media.

22. The method according to claim 18 wherein the service is selected from a group consisting of:
digital television channel;
analog television channel;
video on demand;
internet television;
audio on demand;
radio channel;
telephony;
data; and
internet.

23. The method according to claim 18 wherein at least some of the media service conveying packets are MPEG compliant.

24. The method according to claim 18 wherein the dynamically selection is responsive to at least one selection parameter selected from the group consisting of:
predefined selection parameter;
selection parameter reflecting the type of a service;
selection parameter reflecting a status of at least one end-user;
selection parameter reflecting a previous status of at least one end-user;
predefined priority parameter;
selection parameter reflecting requests to receive a service;
selection parameters reflecting a current provision of a service to end-users;
selection parameters reflecting previous provisions of a requested service;
selection parameters reflecting a relationship between at least two services; and
selection parameters reflecting at least one end-user behavior pattern.

25. The method according to claim 18, wherein the selection is responsive to additional information selected from the group consisting of:
bandwidth utilization information;
bandwidth network management information;
policy information;
general policy rules;
network policy rules;
shared area session policy rules; and
network reconstruction information.

26. The method according to claim 18 wherein the step of selecting includes selecting session requests, for executing a session in which group associated service conveying packets are to be provided to an associated group of end-users.

27. The method of step 26 wherein the step of selecting is preceded by a step of allocating system resources for providing the group associated service conveying packets.

28. A method for dynamic provision of service conveying packets to groups of end-users, each group of end-users is coupled to the system via a bandwidth limited medium, at least some of the service conveying packets being media service conveying packets, the method comprising the steps of:
receiving non-addressable service conveying packets from an input port selected from at least one non-addressable stream input port;
dynamically selecting a group associated service conveying packets out of the received service conveying packets to be provided to at least one of a plurality of non-addressable stream output ports; whereas at least one non-addressable stream output port is coupled to at least one group of end-users; and
directing said non-addressable service conveying packet to said selected non-addressable stream output port.

29. The method according to claim 28 wherein the selection responsive to the type and identity of said selected input port and the identity information embedded in said received packet.

30. The method according to claim 28, wherein said input port is further selected from at least one addressable stream input port.

31. The method according to claim 28, further comprising the step of prioritizing the directing of the session associate with said received packet.

32. The method according to claim 28, further comprising the step of encapsulating said packet in a non-addressable stream packet, when said packet is received from one of said at least one addressable stream input ports.

33. The method according to claim 28, further comprising the step of encapsulating said packet in a addressable stream packet, when said packet is received from one of said at least one non-addressable stream input ports.

34. The method according to claim 28, further comprising the step of stream processing said packet.

35. The method according to claim 34, wherein said step of stream processing said packet includes at least a procedure selected from the list consisting of:
multiplexing;
re-multiplexing;
rate adaptation;
PID re-mapping;
PCR re-stamping; and
updating system information embedded in transport streams.

36. The method according to claim 28 wherein the selection is responsive to requests from end-users to receive requested service conveying packets.

37. The method according to claim 36 wherein the service request is generated in response to a display of a service request interface selected from the group consisting of:
- an electronic service guide;
- a surfing channel that cycles through available channels;
- a surfing mosaic displaying accessible services; and
- a menu of accessible services.

38. The method according to claim 28 wherein the step of selecting comprising selectively compressing media service conveying packets such that the aggregate bandwidth of group associated service conveying packets does not exceed the bandwidth of the limited bandwidth media.

39. The method according to claim 28 wherein the service is selected from a group consisting of:
- digital television channel;
- analog television channel;
- video on demand;
- internet television;
- audio on demand;
- radio channel;
- telephony;
- data; and
- internet.

40. The method according to claim 28 wherein at least some of the media service conveying packets are MPEG compliant.

41. The method according to claim 28 wherein the dynamically selection is responsive to at least one selection parameter selected from the group consisting of:
- predefined selection parameter;
- selection parameter reflecting the type of a service;
- selection parameter reflecting a status of at least one end-user;
- selection parameter reflecting a previous status of at least one end-user;
- predefined priority parameter;
- selection parameter reflecting requests to receive a service;
- selection parameters reflecting a current provision of a service to end-users;
- selection parameters reflecting previous provisions of a requested service;
- selection parameters reflecting a relationship between at least two services; and
- selection parameters reflecting at least one end-user behavior pattern.

42. The method according to claim 28, wherein the selection is further responsive to additional information selected from the group consisting of:
- bandwidth utilization information;
- bandwidth network management information;
- policy information;
- general policy rules;
- network policy rules;
- shared area session policy rules; and
- network reconstruction information.

43. The method according to claim 28 wherein the step of selecting including selecting session requests, for executing a session in which group associated service conveying packets are to be provided to an associated group of end-users.

44. The method according to claim 43 wherein the step of selecting is preceded by a step of allocating system resources for providing the group associated service conveying packets.

* * * * *